(12) United States Patent
Lu et al.

(10) Patent No.: US 11,791,710 B2
(45) Date of Patent: Oct. 17, 2023

(54) SWITCHING SEQUENCE CONTROLLED CURRENT STEERING FOR STACKED HALF BRIDGE CONVERTERS

(71) Applicant: Apple Inc., Cupertino, CA (US)

(72) Inventors: Jie Lu, Cupertino, CA (US); Brandon Pierquet, San Francisco, CA (US); Ashish K. Sahoo, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 171 days.

(21) Appl. No.: 17/182,856

(22) Filed: Feb. 23, 2021

(65) Prior Publication Data

US 2022/0271646 A1 Aug. 25, 2022

(51) Int. Cl.
*H02M 5/293* (2006.01)
*H02M 7/483* (2007.01)
*H02M 1/15* (2006.01)
*H02M 7/53* (2006.01)
*H02M 3/335* (2006.01)
*H02M 1/00* (2006.01)

(52) U.S. Cl.
CPC ............ *H02M 1/15* (2013.01); *H02M 5/293* (2013.01); *H02M 7/53* (2013.01); *H02M 1/0054* (2021.05); *H02M 1/0074* (2021.05); *H02M 1/0095* (2021.05); *H02M 3/33571* (2021.05); *H02M 7/4833* (2021.05)

(58) Field of Classification Search
CPC ............ H02M 1/0054; H02M 1/0058; H02M 1/0074; H02M 1/0095; H02M 1/15; H02M 3/01; H02M 3/015; H02M 3/33569; H02M 3/33571; H02M 3/33573; H02M 3/33576; H02M 5/225; H02M 5/293; H02M 5/2932; H02M 5/2937; H02M 5/297; H02M 7/483; H02M 7/4833; H02M 7/4837; H02M 7/53
See application file for complete search history.

(56) References Cited

U.S. PATENT DOCUMENTS

| | | | |
|---|---|---|---|
| 2013/0194840 A1* | 8/2013 | Huselstein | H02M 1/32 363/50 |
| 2017/0005590 A1* | 1/2017 | Hasegawa | H02M 7/487 |
| 2019/0181774 A1* | 6/2019 | Liu | H02M 7/4833 |
| 2019/0229633 A1* | 7/2019 | Perreault | H01F 27/38 |
| 2020/0099313 A1* | 3/2020 | Huang | H02M 7/5387 |
| 2020/0127576 A1* | 4/2020 | Hayashi | H02M 3/01 |
| 2020/0228017 A1* | 7/2020 | Hu | H02M 3/33584 |
| 2020/0228022 A1* | 7/2020 | Hu | H02M 1/15 |
| 2021/0194374 A1* | 6/2021 | Deng | H02M 1/4258 |
| 2021/0226534 A1* | 7/2021 | Lu | H02M 1/0095 |
| 2022/0085728 A1* | 3/2022 | Mantooth | H02M 3/01 |
| 2022/0216801 A1* | 7/2022 | Sigamani | H02M 1/0074 |

* cited by examiner

*Primary Examiner* — Fred E Finch, III
(74) *Attorney, Agent, or Firm* — FLETCHER YODER PC

(57) ABSTRACT

A stacked half bridge converter may be configured to provide an AC output voltage from either a DC or an AC input voltage. The switching devices of the converter may be operated according to a plurality of switching sequences, each switching sequence including one or more switching patterns, each switching pattern including one or more switching states of the switching devices. The switching sequences, patterns, and states may be selected to improve operation of the converter, by regulating the voltage at a neutral point of the converter to reduce ripple, increase switching efficiency, protect the switching devices from overvoltages, and the like.

19 Claims, 12 Drawing Sheets

HV to LV DCDC converter

Multi-stage HV Charger

Single-stage HV Charger

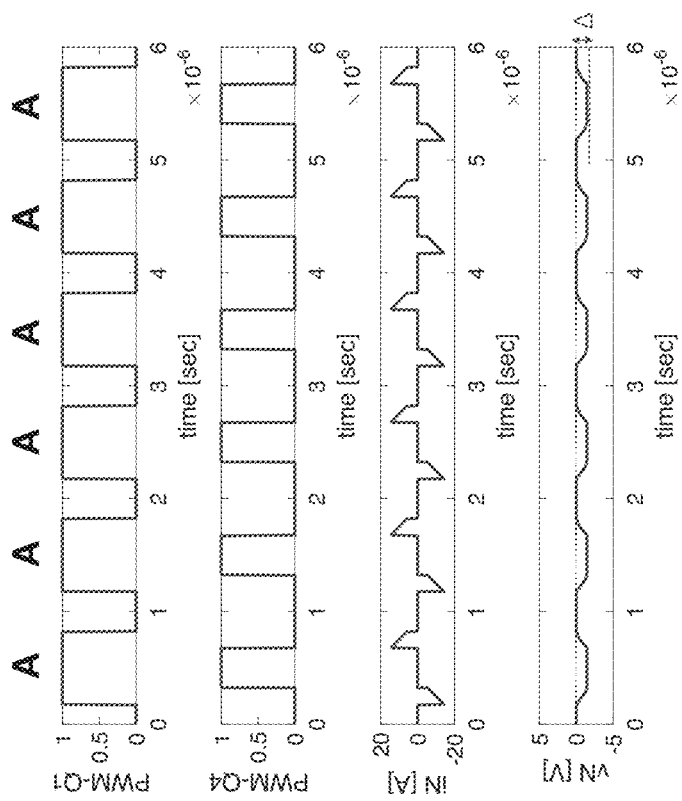
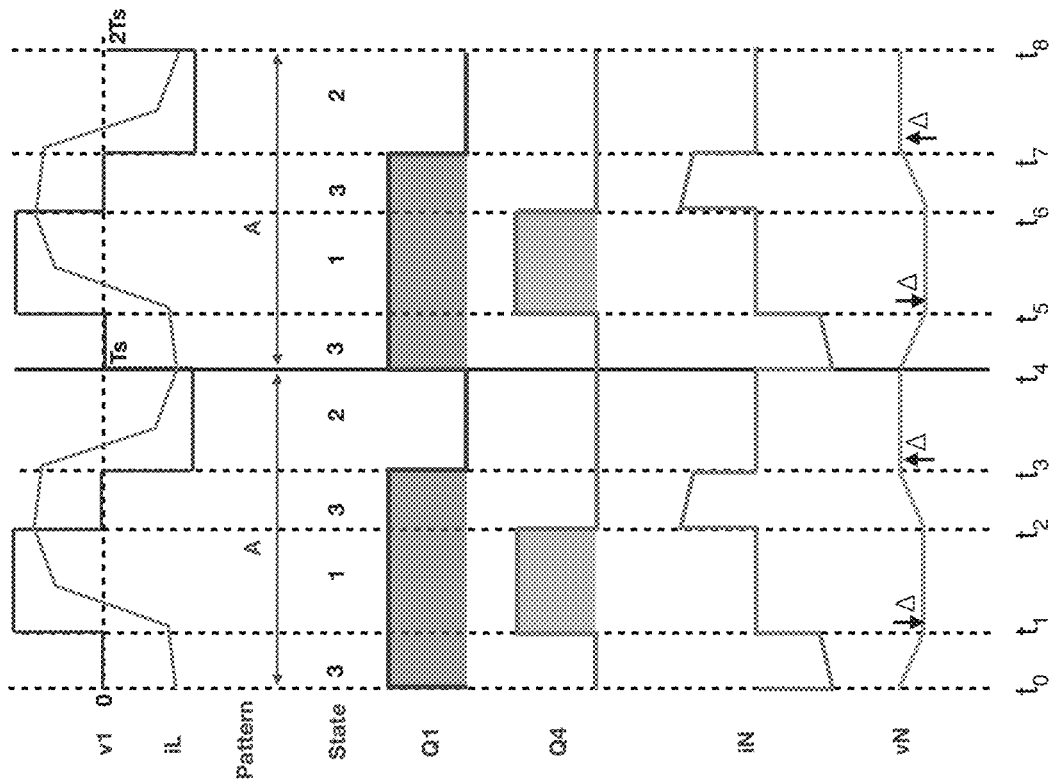
FIG. 4B
FIG. 4A

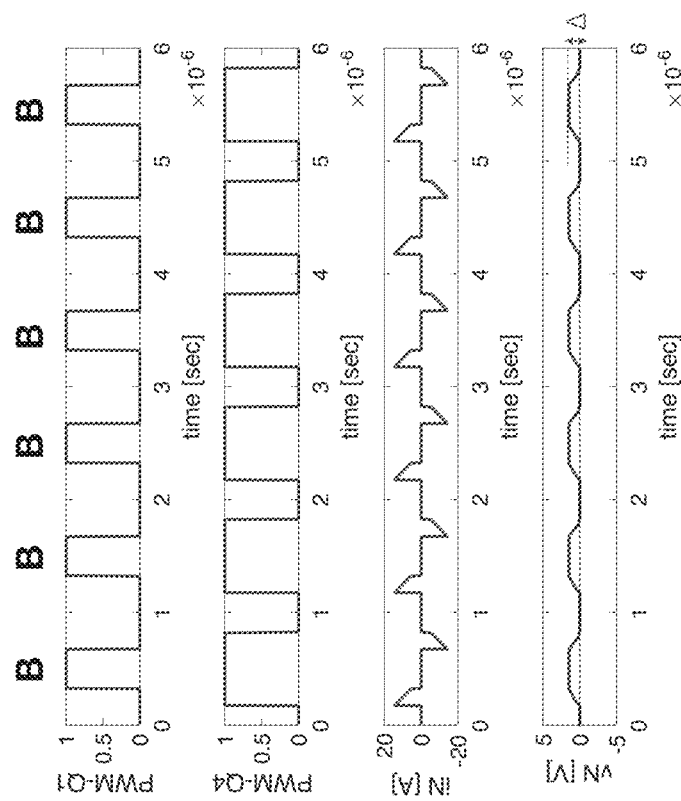
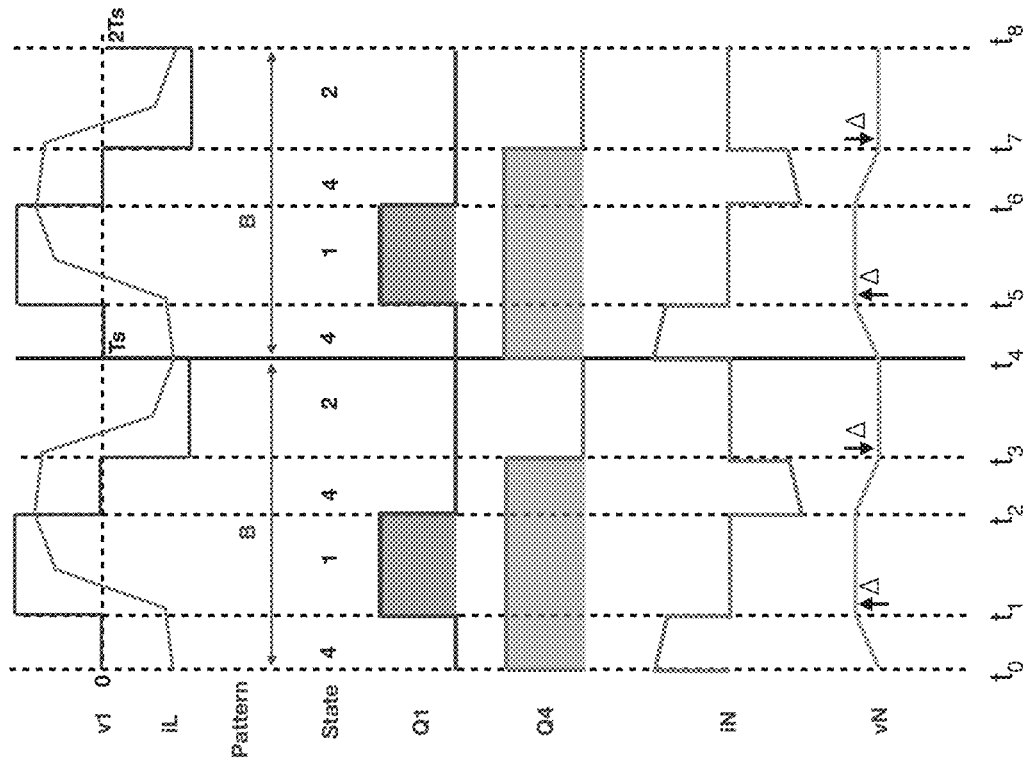
FIG. 5A
FIG. 5B (a) HF current path for Q4 when Q2 is on (b) HF current path for Q4 when Q1 is on (c) Additional HF current path for Q4 when Q2 is on (d) Additional HF current path for Q4 when Q1 is on

SWITCHING SEQUENCE CONTROLLED CURRENT STEERING FOR STACKED HALF BRIDGE CONVERTERS

BACKGROUND

High voltage battery systems have recently proliferated into a variety of applications. Such systems may find applications in hybrid and fully electric vehicles, solar power systems, electrical grid storage systems, and the like. Increasing prevalence of these systems has demonstrated a need for various improved converter configurations for use in delivering energy to and extracting energy from such systems. Such converters may be employed in various combinations to achieve high voltage to low voltage DC-DC conversion (as might be used in an electric vehicle) or for high voltage battery charging, which is applicable to any high voltage battery system. In many applications, these converters may take the form of various combinations of DC-AC converters, AC-AC converters (both sometimes known as inverters) as well as AC-DC converters. One topology that may find application to such systems is the stacked half bridge converter.

SUMMARY

In many applications it may be desirable to improve the operating efficiency of a power converter while also reducing one or more of the size, cost, complexity, and/or number of components of the power converter. Described herein are various embodiments of stacked half bridge converters that attempt to achieve one or more of these objectives.

A stacked half-bridge DC-AC converter can include a first half bridge including a first switching device and a second switching device, wherein a junction point of the first and second switching devices is coupled to a first AC output terminal of the converter. The converter can also include a second half bridge including a third switching device and a fourth switching device, wherein a junction point of the third and fourth switching devices is coupled to a second AC output terminal of the converter and wherein the first and second half bridges are connected in a ladder configuration across a DC input of the converter. The converter can further include first and second input capacitors connected in a ladder configuration across the DC input of the converter, wherein a junction point of the first and second capacitors is connected to a junction point of the first and second half bridges forming a neutral point of the converter. The converter can also include a controller configured to operate the switching devices according to a plurality of switching sequences, each switching sequence including one or more switching patterns, and each switching pattern including a plurality of switching states, each switching state including modulated operation of at least one switching device from each of the first and second half bridges.

At least one of the plurality of switching sequences can include one or more patterns of switching states selected to inject current into the neutral point to regulate the voltage of the neutral point, reduce a ripple voltage of the neutral point, or equalize losses among the switching devices. Modulated operation of at least one switching device from each of the first and second half bridges can include pulse width modulated operation. At least one of the plurality of switching sequences may inject positive current into the neutral point to increase the voltage of the neutral point. At least one switching sequence may be selected to inject negative current into the neutral point to decrease the voltage of the neutral point.

The plurality of switching states may be selected from the group consisting of a first switching state in which the first and fourth switching devices are operated, a second switching state in which the second and third switching devices are operated, a third switching state in which the first and third switching devices are operated, and a fourth switching state in which the second and fourth switching devices are operated.

The one or more switching patterns may be selected from the group consisting of a first switching pattern consisting of the third switching state, followed by the first switching state, followed by the third switching state, followed by the second switching state; a second switching pattern consisting of the fourth switching state, followed by the first switching state, followed by the fourth switching state, followed by the second switching state; a third switching pattern consisting of the third switching state, followed by the first switching state, followed by the fourth switching state, followed by the second switching state; and a fourth switching pattern consisting of the fourth switching state, followed by the first switching state, followed by the third switching state, followed by the second switching state.

The one or more switching sequences may be selected from the group consisting of a first switching sequence consisting of a number of repetitions of the first switching pattern followed by an equal number of repetitions of the second switching pattern, a second switching sequence consisting of a number of repetitions of the first switching pattern followed by an equal number of repetitions of the second switching pattern, wherein a first occurrence of the second switching pattern is replaced with the third switching pattern, and a third switching sequence consisting of a number of repetitions of the first switching pattern followed by an equal number of repetitions of the second switching pattern, wherein a first occurrence of the first switching pattern is replaced with the fourth switching pattern. The number of repetitions may be five or any other suitable number.

A stacked half-bridge AC-AC converter can include a first half bridge including a first switching device and a second switching device, wherein a junction point of the first and second switching devices is coupled to a first AC output terminal of the converter. The converter can also include a second half bridge including a third switching device and a fourth switching device, wherein a junction point of the third and fourth switching devices is coupled to a second AC output terminal of the converter and wherein the first and second half bridges are connected in a ladder configuration across an AC input of the converter. The converter can further include first and second input capacitors connected in a ladder configuration across the AC input of the converter, wherein a junction point of the first and second capacitors is connected to a junction point of the first and second half bridges forming a neutral point of the converter.

The converter may also include a controller configured to operate the switching devices according to a plurality of switching sequences, each switching sequence including one or more switching patterns, and each switching pattern including a plurality of switching states, each switching state including modulated operation of at least one switching device from each of the first and second half bridges. At least one of the plurality of switching sequences includes one or more patterns of switching states selected to inject current into the neutral point to regulate the voltage of the neutral point, reduce switching losses, or equalize losses among the switching devices. Modulated operation of at least one switching device from each of the first and second half bridges includes pulse width modulated operation. At least one of the plurality of switching sequences may inject positive current into the neutral point to increase the voltage of the neutral point. At least one switching sequence may be selected to inject negative current into the neutral point to decrease the voltage of the neutral point.

The plurality of switching states can include one or more of a first switching state in which the first, third, and fourth switching devices are operated; a second switching state in which the second, third, and fourth switching devices are operated; a third switching state in which the first, second, and fourth switching devices are operated; a fourth switching state in which the first, second, and third switching devices are operated; a fifth switching state in which the first and fourth switching devices are operated; a sixth switching state in which the second and third switching devices are operated; a seventh switching state in which the first and third switching devices are operated; and an eighth switching state in which second and fourth switching devices are operated.

The one or more switching patterns can include one or more of a first switching pattern operable during alternating half cycles of an AC input waveform, the first switching pattern consisting of repeated alternation of the fifth switching state followed by the sixth switching state; and a second switching pattern operable during alternating half cycles of the AC input waveform, the second switching pattern consisting of repeated alternation of the sixth switching state followed by the fifth switching state. The first switching pattern may be operable during positive half cycles of the AC input waveform, and the second switching pattern may be operable during negative half cycles of the AC input waveform. The first switching pattern may be operable during negative half cycles of the AC input waveform and the second switching pattern is operable during positive half cycles of the AC input waveform.

The one or more switching patterns may include one or more of a third switching pattern operable during alternating half cycles of an AC input waveform, the third switching pattern consisting of the seventh switching state, followed by the sixth switching state, followed by the eighth switching state, followed by the fifth switching state; and a fourth switching pattern operable during alternating half cycles of the AC input waveform, the fourth switching pattern consisting of the seventh switching state, followed by the fifth switching state, followed by the eighth switching state, followed by the sixth switching state. The third switching pattern may operable during positive half cycles of the AC input waveform, and the fourth switching pattern may be operable during negative half cycles of the AC input waveform. Alternatively, the fourth switching pattern is operable during negative half cycles of the AC input waveform, and the third switching pattern is operable during positive half cycles of the AC input waveform.

The one or more switching patterns can also include one or more of a fifth switching pattern operable during alternating half cycles of an AC input waveform, the fifth switching pattern consisting of the fifth switching state, followed by the eighth switching state, followed by the sixth switching state; and a sixth switching pattern operable during alternating half cycles of the AC input waveform, the sixth switching pattern consisting of the seventh switching state, followed by the sixth switching state, followed by the fifth switching state. The fifth switching pattern may be operable during positive half cycles of the AC input waveform, and the sixth switching pattern may be operable during negative half cycles of the AC input waveform. The sixth switching pattern may be operable during negative half cycles of the AC input waveform and the fifth switching pattern may be operable during positive half cycles of the AC input waveform.

A stacked half-bridge AC-AC can include a first half bridge including a first switching device and a second switching device, wherein a junction point of the first and second switching devices is coupled to a first AC output terminal of the converter. The converter can further include a second half bridge including a third switching device and a fourth switching device, wherein a junction point of the third and fourth switching devices is coupled to a second AC output terminal of the converter and wherein the first and second half bridges are connected in a ladder configuration across an AC input of the converter. The converter can also include first and second input capacitors connected in a ladder configuration across the AC input of the converter, wherein a junction point of the first and second capacitors is connected to a junction point of the first and second half bridges forming a neutral point of the converter. The converter can also include a third input capacitor connected across the AC input of the converter.

A stacked half bridge converter may be configured to provide an AC output voltage and can include four switching devices configured in an upper half bridge and a lower half bridge and at least two capacitors. An input of the power converter may be provided across the first terminal of a first switching device and a second terminal of a fourth switching device and an output of the converter may be provided between a junction of a second terminal of the first switching device and a first terminal of a second switching device and a junction of a second terminal of a third switching device and a first terminal of the fourth switching device. The at least two capacitors may include a first capacitor coupled between the first terminal of the first switching device and a neutral point corresponding to a junction of a second terminal of the second switching device and a first terminal of the third switching device and a second capacitor coupled between the second terminal of the fourth switching device and the neutral point. The converter can further include a control circuit configured to operate the switching devices according to a plurality of switching sequences, each switching sequence including one or more switching patterns, each switching pattern including one or more switching states of the switching devices. The converter may be configured so that the input of the power converter is configured to receive a DC voltage greater than a voltage rating of the switching devices, and the control circuit is configured balance the voltage appearing across the first and second capacitors to prevent exceeding the voltage rating of the switching devices. The input of the power converter may be configured to receive an AC voltage, and the control circuit is configured control the voltage appearing across the first and second capacitors to reduce switching losses.

BRIEF DESCRIPTION OF THE DRAWINGS

FIG. 4A-4B illustrate various waveforms corresponding to an alternative sequence of switching states of a stacked half bridge DC-AC converter.

FIG. 5A-5B illustrates various waveforms corresponding to additional alternative switching states of a stacked half bridge DC-AC converter.

DETAILED DESCRIPTION

Figure 1A:
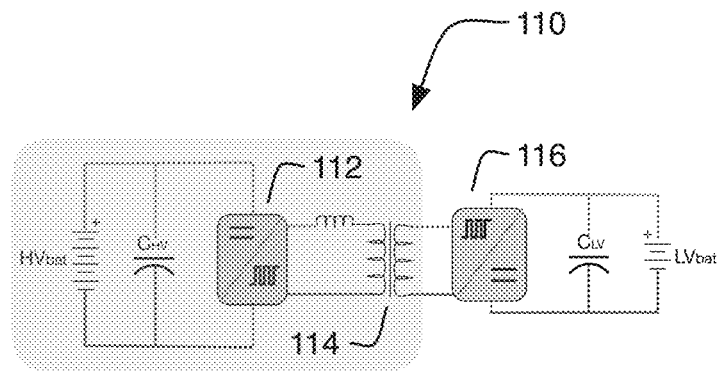
FIGS. 1A-1C illustrate various exemplary converter configurations.

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth in order to provide a thorough understanding of the implementations described herein. In other instances, methods, procedures and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. Likewise, unless otherwise noted, features from the various embodiments may be combined in differing combinations to arrive at other embodiments not specifically discussed herein. A reference number, when provided in a given drawing, refers to the same element throughout the several drawings, though it may not be repeated in every drawing. The drawings are not to scale unless otherwise indicated, and the proportions of certain parts may be exaggerated to better illustrate details and features of the present disclosure.

Figure 1B:
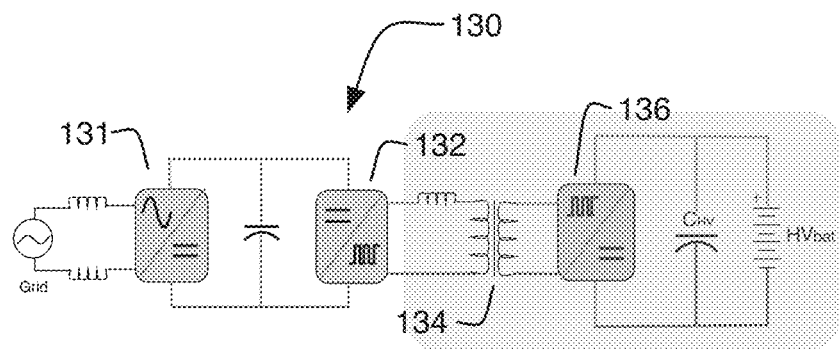
Figure 1C:
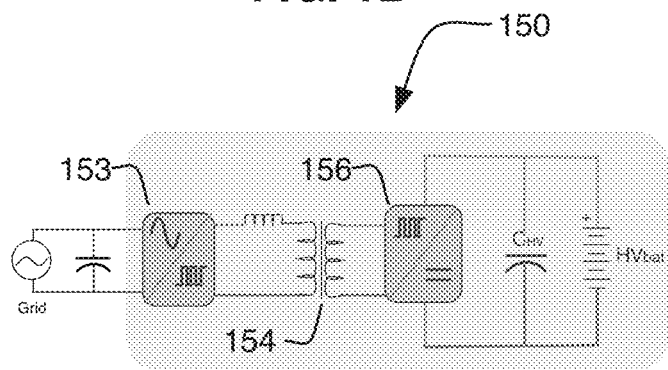

FIGS. 1A-1C illustrate high level block diagrams of various applications for the converters described herein. More specifically, FIG. 1A illustrates a high voltage to low voltage DC-DC converter 110. HVLV DC-DC converter 110 receives a high voltage DC input voltage from a high voltage battery HVbat. This high DC voltage may be converted to a high AC voltage by DC-AC converter 112. The high AC voltage may be applied to the primary winding of a step down transformer 114 that produces a corresponding/proportional lower AC voltage on its secondary windings. This lower AC voltage may be applied to the input terminals of AC-DC converter 116, which may convert the lower AC voltage to a lower DC voltage that may be applied to a low voltage DC bus, including, for example, capacitor CLV and low voltage battery LVbat.

FIG. 1B illustrates a multi-stage high voltage charger 130. Charger 130 receives an AC input voltage from the AC grid, which is applied to a rectifier 131. This produces a DC voltage that may be supplied as an input to DC-AC converter 132, which produces a relatively low AC voltage. This relatively low voltage may be applied to the primary winding of step up transformer 134, which may convert this relatively lower AC voltage into a corresponding/proportional higher AC voltage. This higher AC voltage may be applied to the input of AC-DC converter 136, which may convert the higher AC voltage into a high DC voltage that may be supplied to a high voltage DC bus, including, for example, capacitor CHV and high voltage battery HVbat, which may be charged by the high voltage.

FIG. 1C illustrates a simplified, single-stage high voltage charger 150. Charger 150 receives an AC input voltage from the AC grid, which is applied to AC-AC converter 153. This produces a relatively low AC voltage that may be applied to the primary winding of step up transformer 154. Step up transformer 154 thus produces a corresponding/proportional higher AC voltage on its secondary windings. This higher AC voltage may be applied to the input of AC-DC converter 156, which may convert the higher AC voltage into a high DC voltage that may be supplied to a high voltage DC bus, including, for example, capacitor CHV and high voltage battery HVbat, which may be charged by the high voltage.

The above-described power converter applications are intended as illustrative examples, and it will be appreciated that other embodiments and variations are also possible.

DC-AC Applications

Figure 2A:
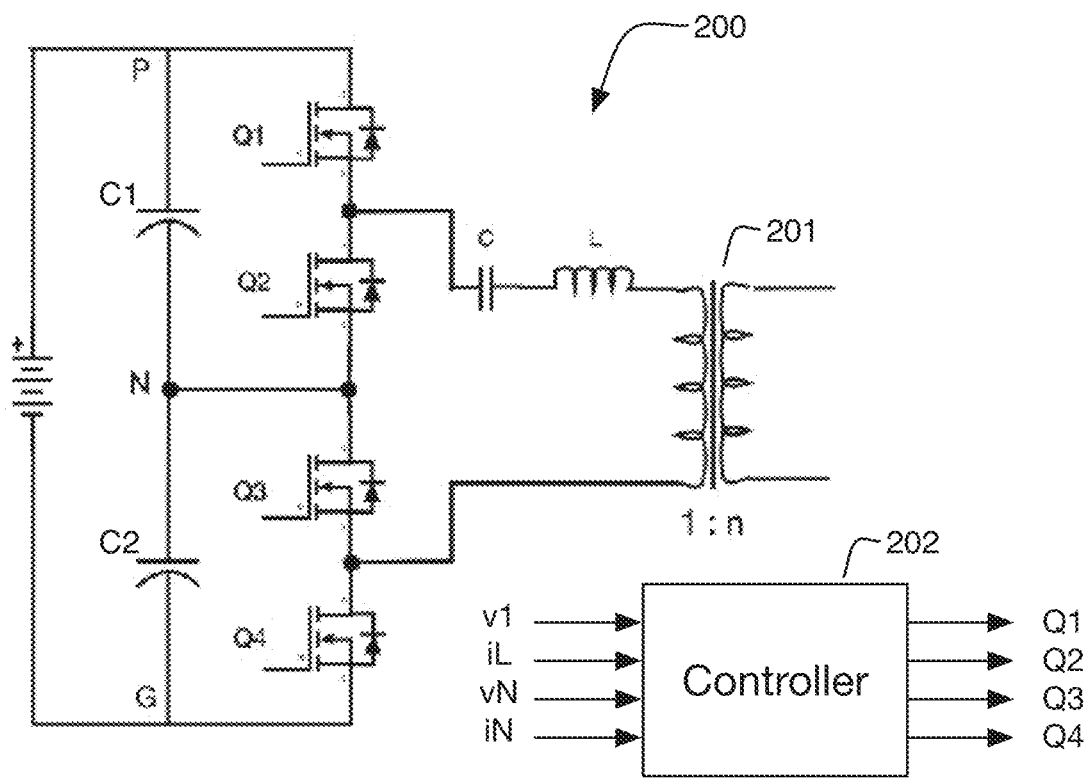
FIG. 2A-2B illustrate a schematic depiction of a stacked half bridge DC-AC converter and various switching states of a stacked half bridge DC-AC converter.

FIG. 2A illustrates an exemplary stacked half bridge DC-AC converter 200, which is one type of converter that may be used in the above described (or other) applications as appropriate. As the name suggests, stacked half bridge converter 200 includes stacked half bridge switching arrangements, first/upper half bridge including switching devices Q1 and Q2 and a second/lower half bridge including switching devices Q3 and Q4. In the illustrated embodiment, the switching devices are n-channel MOSFETs, although other types of switching devices may be used as appropriate for a given embodiment.

The half bridges are "stacked" in that they are connected in a ladder configuration across a DC input, which may, for example, be supplied by a high voltage battery. A first terminal P of the upper half bridge may be coupled to the positive terminal of the DC input voltage, and a second terminal G of the lower half bridge may be coupled to the negative terminal of the DC input voltage. The second terminal of the first half bridge may be coupled to the first terminal of the second half bridge, which may be coupled to a neutral point N (being the neutral of the AC output voltage). Input capacitors C1 and C2 may be provided between terminals P and N and G and N, respectively. The switched nodes of the upper and lower half bridges may be coupled to a transformer 201 via a blocking capacitor C and an inductor L.

Switches Q1-Q4 may be alternately opened and closed in various combinations or switching states, which are discussed in greater detail below with reference to FIG. 2B. Operation of switches Q1-Q4 may be performed by a controller 202. Controller 202 may take a variety of forms, including analog control circuitry, digital control circuitry, hybrid analog-digital control circuitry, and/or programmable circuitry in the form of a microcontroller or other programmed processor. Controller 202 may be configured with suitable control loops and/or logic to operate switches Q1-Q4 to provide suitable regulation of one or more circuit parameters, such as output voltage, output current, etc. responsive to various control inputs.

Figure 2B:
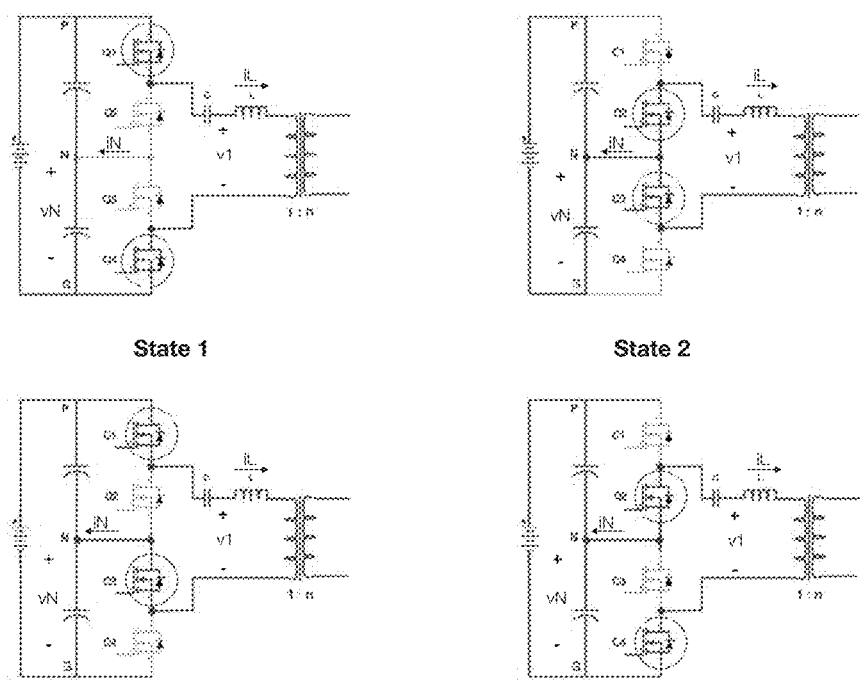

In the illustrated embodiment, controller 202 can receive four inputs, which are schematically depicted in FIG. 2B. Voltage v1 is the output voltage of the stacked half bridge converter, appearing across the primary winding of transformer 201. Load current iL is the output current of the converter flowing through the transformer primary winding. Voltage vN is the voltage of neutral point N, which in some embodiments may preferably kept near one-half the input DC voltage. Current iN is the current injected into the neutral point N. Controller 202 may be configured to produce four outputs Q1-Q4 corresponding to drive signals for the switching devices Q1-Q4.

The drive signals for switching devices Q1-Q4 may be used to generate the desired output for the converter. More specifically, controlling the timing of the switching events can control the output voltage, output current, or other parameters of the converter. For example, the switches may be operated using any of a variety of duty cycle, frequency, or other timing based control, such as pulse width modulation (PWM), pulse frequency modulation (PFM), or other suitable control techniques. For purposes of the following description, pulse width modulation (PWM) will be assumed.

FIG. 2B illustrates four switching states that may be used by the controller to operate the stacked half bridge DC-AC converter of FIG. 2A as a DC to AC converter. In State 1, upper switch Q1 of the upper half bridge is activated, as is the lower switch Q4 of the lower half bridge. By activated, it is meant that the switches are operated with a suitable modulation (such as pulse width modulation) to suitably regulate the output voltage, output current, or other controlled parameter. The on-off timing and duration of the activated switch pair will be determined by the controller and may vary depending on the particular controller implementation. Switches Q2 and Q3 are deactivated in State 1. By deactivated, it is meant that they are left off and not modulated in the referenced state In State 2, lower switch Q2 of the upper half bridge and upper switch Q3 of the lower half bridge are activated, with switches Q1 and Q4 being deactivated. In State 3, upper switches Q1 and Q3 of both the upper and lower half bridges are activated, with switches Q2 and Q4 being deactivated. In State 4, lower switches Q2 and Q4 of both the upper and lower half bridges are activated, with switches Q1 and Q3 being deactivated. As discussed in greater detail below with respect to FIGS. 3-6, these switching states may be combined into various patterns, with the various patterns being combined into switching sequences, with differing switching sequences employed to improve converter operation.

In each of the switching states, the DC voltage appears across the series combination of input capacitors C1 and C2, which, as noted above, are connected across the input DC voltage with their junction joined with the junction of the upper and lower half bridges. This junction forms the neutral point of the AC output of the DC-AC converter. These input capacitors may have the same value, and thus, in an ideal world, one-half of the DC input voltage would appear across each capacitor. However, due to a variety of real-world effects, including non-ideal switching, component tolerances, and the like, the input voltage may not be divided exactly evenly across the input capacitors. This can cause operational issues in certain converter designs.

As an example, the DC input source may be a high voltage DC source, e.g., a battery bank having a maximum voltage of a given value. In some embodiments, it may be desirable to use switching devices having a lower rating than the maximum DC source voltage because of availability or cost constraints or other limitations. As a result, in the stacked half bridge topology, the voltage rating of the switching devices may be exceeded if the voltage imbalance between the input capacitors becomes too great. Thus, it may be desirable to provide one or more switching sequences (i.e., sequences of patterns of states) that allow adjustment of the voltage balance between the input capacitors.

Figure 3B:
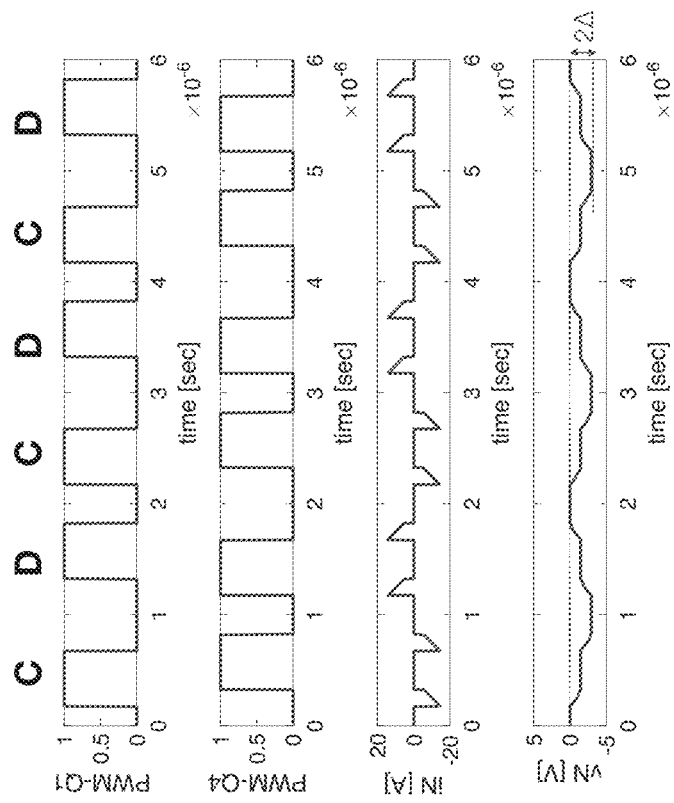
FIG. 3A-3B illustrate various waveforms corresponding to a first sequence of switching states of a stacked half bridge DC-AC converter.
Figure 3A:
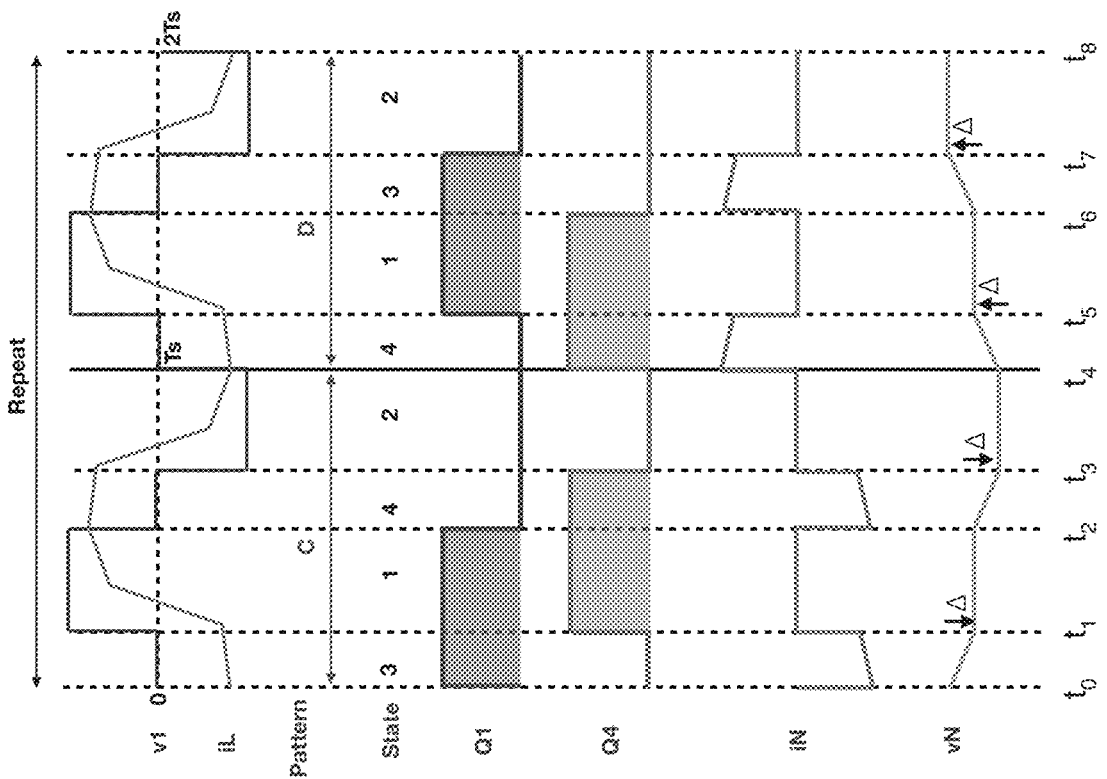

Turning now to FIG. 3A, various waveforms associated with a first switching sequence are illustrated. The switching sequence comprises two switching Patterns C and D. Switching Pattern C includes states 3, 1, 4, and 2 as described above. Switching Pattern D includes states 4, 1, 3, and 2 as described above. FIG. 3A illustrates two full switching periods, each having length Ts. In the first switching period, Pattern C is applied. In the second switching period, Pattern D is applied. In the upper traces, the AC output voltage v1 and AC output current iL that are applied to the primary winding of the transformer are illustrated. (The locations of voltage v1 and current iL are identified in FIG. 2B.) Below this, the pattern identification for each switching period and corresponding switching states are identified. Below this, the states of switching devices Q1 and Q4 are illustrated, with a high signal indicating that the switch is activated and a low signal indicating that the switch is deactivated. Switching device Q2 is activated complementarily to Q1, and switching device Q3 is activated complementarily to Q4. By "complementarily" it is meant that one switch of each half bridge is deactivated while the other is activated and vice-versa. Below this, the injected neutral current iN is plotted, and below this, the neutral point voltage is indicated. The location of the injected neutral current and neutral voltage are identified in FIG. 2B.

Beginning at time t0, the converter may begin switching Pattern C, which corresponds to cycling through State 3, State 1, State 4, and State 2. At time t0, State 3 begins, in which switches Q1 and Q3 are activated, and switches Q2 and Q4 are deactivated. As a result, negative current iL is flowing in the transformer primary winding, and a zero voltage v1 is applied to the primary winding. Additionally, a negative neutral current iNt is flowing from the junction of the input capacitors, which causes a decrease in the voltage vN appearing across the lower input capacitor. This negative iN current pulls sufficient energy from the lower input capacitor to decrease the voltage thereacross by an amount Δ by time t1. Because the input capacitors are connected in series across the input voltage, there will be a corresponding increase in the voltage across the upper input capacitor.

At time t1, the converter switches to State 1, still part of Pattern C. In this state, Q1 and Q4 are activated, with Q2 and Q3 deactivated. This applies the input DC voltage across the transformer primary winding (v1) and causes the negative output current iL to increase (become less negative), eventually becoming positive. In this state, no neutral current iN is injected, and the neutral voltage vN remains constant.

At time t2, the converter switches to State 4, still part of Pattern C. In this state, Q2 and Q4 are activated, with Q1 and Q3 deactivated. This applies zero voltage across the transformer primary, and the output current iL begins decreasing. Additionally, a negative current is delivered to the neutral point. In other words, a negative neutral current is flowing from the junction of the input capacitors, which causes a decrease in the voltage vN appearing across the lower input capacitor. This negative iN current pulls sufficient energy from the lower input capacitor to decrease the voltage thereacross by an amount Δ by time t3. Because the input capacitors are connected in series across the input voltage, there will be a corresponding increase in the voltage across the upper input capacitor.

At time t3, the converter switches to state 2, still part of Pattern C. In this state, Q2 and Q3 are activated, with Q1 and Q4 deactivated. This results in the negative of the input voltage appearing across the transformer primary (v1), as the transformer primary current decreases, eventually becoming negative. At time t4, Pattern C ends and Pattern D begins.

Beginning at time t4, the converter may begin switching Pattern D, which corresponds to cycling through State 4, State 1, State 3, and State 2. Pattern D is thus essentially Pattern C with States 3 and 4 reversed. Thus, at time t4, State 4 begins, in which switches Q2 and Q4 are activated, and switches Q1 and Q3 are deactivated. The previously discussed negative current iL continues flowing in the transformer primary winding, and a zero voltage v1 is applied to the primary winding. Additionally, a positive neutral current iN is flowing into the junction of the input capacitors, which causes an increase in the voltage vN appearing across the lower input capacitor. This positive iN current delivers sufficient energy to the lower input capacitor to increase the voltage thereacross by an amount Δ by time t5. Because the input capacitors are connected in series across the input voltage, there will be a corresponding decrease in the voltage across the upper input capacitor.

At time t5, the converter switches to State 1, still part of Pattern D. In this state, Q1 and Q4 are activated, with Q2 and Q3 deactivated. This applies the input DC voltage across the transformer primary winding (v1) and causes the negative output current iL to increase (become less negative), eventually becoming positive. In this state, no neutral current iN is injected, and the neutral voltage vN remains constant.

At time t6, the converter switches to State 3, still part of Pattern D. In this state, Q1 and Q3 are activated, with Q2 and Q4 deactivated. This applies zero voltage across the transformer primary (v1), and the output current iL begins decreasing. Additionally, a positive current iN is delivered to the neutral point. In other words, a neutral current is flowing into the junction of the input capacitors, which causes an increase in the voltage vN appearing across the lower input capacitor. This positive iN current delivers sufficient energy to the lower input capacitor to decrease the voltage thereacross by an amount Δ by time t7.

At time t7, the converter switches to state 2, still part of Pattern D. In this state, Q2 and Q3 are activated, with Q1 and Q4 deactivated. This results in the negative of the input voltage appearing across the transformer primary (v1), as the transformer primary current decreases, eventually becoming negative. At time t8, Pattern D ends and Pattern C may repeat.

FIG. 3B illustrates a diagram of certain waveforms from the alternating Pattern C/Pattern D sequence described with reference to FIG. 3A. More specifically, FIG. 3B shows a sequence of six switching state patterns, alternating between Pattern C and D. Waveform PWM-Q1 shows when PWM switching is activated for switch Q1. Waveform PWM-Q4 shows when switching is activated for switch Q4. The iN waveform shows the neutral current pulses that are injected as a result of the switching patterns. As discussed above, Pattern C results in two negative neutral current pulses, and Pattern D results in two positive current pulses. Finally, waveform vN shows the neutral voltage which has a ripple with a magnitude of 2Δ and a frequency corresponding to the combined sequence length (namely 4× the length of each pattern).

Additionally, because of the way Pattern C pulls energy from the lower input capacitor and Pattern D delivers energy to the input capacitor, every Pattern C must have a corresponding Pattern D to prevent the input capacitors from becoming increasingly unbalanced. Additionally, the amount of time between a Pattern C and its corresponding Pattern D will determine the peak amount of imbalance that exists as well as the magnitude of the neutral voltage ripple. However, as illustrated in FIGS. 4A-4B and 5A-5B, alternative switching sequences may be employed to reduce the ripple and/or increase its frequency as well as providing for enhanced control of the voltage imbalance between the input capacitors.

FIG. 4A generally corresponds to FIG. 3A, discussed above, but introduces a new switching Pattern A. Pattern A includes States 3, 1, 3, and 2. Thus, beginning at time t0, State 3 begins, in which switches Q1 and Q3 are activated, and switches Q2 and Q4 are deactivated. As a result, negative current iL is flowing in the transformer primary winding, and a zero voltage v1 is applied to the primary winding. Additionally, a negative neutral current iNt is flowing from the junction of the input capacitors, which causes a decrease in the voltage vN appearing across the lower input capacitor. This negative iN current pulls sufficient energy from the lower input capacitor to decrease the voltage thereacross by an amount Δ by time t1. Because the input capacitors are connected in series across the input voltage, there will be a corresponding increase in the voltage across the upper input capacitor.

At time t1, the converter switches to State 1, still part of Pattern A. In this state, Q1 and Q4 are activated, with Q2 and Q3 deactivated. This applies the input DC voltage across the transformer primary winding (v1) and causes the negative output current iL to increase (become less negative), eventually becoming positive. In this state, no neutral current iN is injected, and the neutral voltage vN remains constant.

At time t2, the converter switches back to State 3, still part of Pattern A. In this state, Q1 and Q3 are activated, with Q2 and Q4 deactivated. This applies zero voltage v1 across the transformer primary, and the output current iL begins decreasing. Now, a positive current is delivered to the neutral point. In other words, a positive neutral current is flowing into the junction of the input capacitors, which causes an increase in the voltage vN appearing across the lower input capacitor. This positive iN current delivers sufficient energy to the lower input capacitor to increase the voltage thereacross by an amount Δ by time t3. Because the input capacitors are connected in series across the input voltage, there will be a corresponding decrease in the voltage across the upper input capacitor.

At time t3, the converter switches to state 2, still part of Pattern A. In this state, Q2 and Q3 are activated, with Q1 and Q4 deactivated. This results in the negative of the input voltage appearing across the transformer primary (v1), as the transformer primary current decreases, eventually becoming negative. At time t4, Pattern A ends and, in the illustrated sequence Pattern A also repeats.

As a result of the foregoing sequence repeating Pattern A, the neutral voltage experiences a ripple voltage equal to Δ, a reduction as compared to the alternation of Patterns C and D discussed above with respect to the sequence of FIG. 3A-3B. However, because State 3 is repeated, and State 4 is omitted, there can be an imbalance in losses associated with switch pairs Q1 and Q3 versus switch pairs Q2 and Q4. Because State 4 is omitted, Q1 and Q3 experience increased usage relative to switch pairs Q2 and Q4, which can result in increased heating and losses for Q1 and Q3.

FIG. 4B illustrates a diagram of certain waveforms from the repetition of Pattern A sequence described with reference to FIG. 4A. More specifically, FIG. 4B shows a sequence of six switching state patterns, each being Pattern A. Waveform PWM-Q1 shows when PWM switching is activated for switch Q1. Waveform PWM-Q4 shows when switching is activated for switch Q4. The iN waveform shows the neutral current pulses that are injected as a result of the switching patterns. As discussed above, Pattern A results in one negative neutral current pulse followed by one positive neutral current pulse for each pattern. Finally, waveform vN shows the neutral voltage which has a ripple with a magnitude of Δ and a frequency corresponding to the combined sequence length (namely 2× the length of each pattern).

FIG. 5A generally corresponds to FIGS. 3A and 4A, discussed above, but introduces another a new switching Pattern B. Pattern B includes States 4, 1, 4, and 2. Pattern B may thus be considered the complementary to Pattern A as Pattern D is complementary to Pattern C. Thus, beginning at time t0, State 4 begins, in which switches Q2 and Q4 are activated, and switches Q1 and Q3 are deactivated. The previously discussed negative current iL continues flowing in the transformer primary winding, and a zero voltage v1 is applied to the primary winding. Additionally, a positive neutral current iN is flowing into the junction of the input capacitors, which causes an increase in the voltage vN appearing across the lower input capacitor. This positive iN current delivers sufficient energy to the lower input capacitor to increase the voltage thereacross by an amount Δ by time t5. Because the input capacitors are connected in series across the input voltage, there will be a corresponding decrease in the voltage across the upper input capacitor.

At time t1, the converter switches to State 1, still part of Pattern B. In this state, Q1 and Q4 are activated, with Q2 and Q3 deactivated. This applies the input DC voltage across the transformer primary winding (v1) and causes the negative output current iL to increase (become less negative), eventually becoming positive. In this state, no neutral current iN is injected, and the neutral voltage vN remains constant.

At time t2, the converter switches back to State 4, still part of Pattern B. In this state, Q2 and Q4 are activated, with Q1 and Q3 deactivated. This applies zero voltage v1 across the transformer primary, and the output current iL begins decreasing. Now, a negative current is drawn from the neutral point. In other words, a negative neutral current is flowing out of the junction of the input capacitors, which causes a decrease in the voltage vN appearing across the lower input capacitor. This negative iN current draws sufficient energy to the lower input capacitor to increase the voltage thereacross by an amount Δ by time t3. Because the input capacitors are connected in series across the input voltage, there will be a corresponding increase in the voltage across the upper input capacitor.

At time t3, the converter switches to state 2, still part of Pattern B. In this state, Q2 and Q3 are activated, with Q1 and Q4 deactivated. This results in the negative of the input voltage appearing across the transformer primary (v1), as the transformer primary current decreases, eventually becoming negative. At time t4, Pattern B ends and, in the illustrated sequence Pattern B also repeats.

As a result of the foregoing sequence repeating Pattern B, the neutral voltage experiences a ripple voltage equal to Δ, a reduction as compared to the alternation of Patterns C and D discussed above with respect to the sequence of FIGS. 3A and 3B and comparable to the repetition of Pattern A as described with respect to the sequence of FIG. 4A. However, because State 4 is repeated, and State 3 is omitted, there can be an imbalance in losses associated with switch pairs Q2 and Q4 versus switch pairs Q1 and Q3. Because State 3 is omitted, Q2 and Q4 experience increased usage relative to switch pairs Q1 and Q3, which can result in increased heating and losses for Q2 and Q4.

FIG. 5B illustrates a diagram of certain waveforms from the repetition of Pattern B sequence described with reference to FIG. 5A. More specifically, FIG. 5B shows a sequence of six switching state patterns, each being Pattern A. Waveform PWM-Q1 shows when PWM switching is activated for switch Q1. Waveform PWM-Q4 shows when switching is activated for switch Q4. The iN waveform shows the neutral current pulses that are injected as a result of the switching patterns. As discussed above, Pattern A results in one positive neutral current pulse followed by one negative neutral current pulse for each pattern. Finally, waveform vN shows the neutral voltage which has a ripple with a magnitude of Δ and a frequency corresponding to the combined sequence length (namely 2× the length of each pattern).

As described above with respect of FIGS. 3A-5B, there are four switching Patterns A-D, each made up of combinations of four switching states 1-4, as described. Sequences of these switching patterns may be applied to the converter. Sequences including Patterns C and D must include equal numbers of each pattern to prevent excessive voltage imbalance between the input capacitors. Additionally, sequence including Patterns C and D experience a neutral voltage ripple of 2Δ. Finally, losses are evenly distributed across all four switches Q1-Q4 for sequences including Patterns C and D. Conversely, sequences including only Pattern A or only Pattern B may be used, because these patterns used alone do not result in increasing imbalance of the input capacitors. Another advantage of sequences including Patterns A and/or B is that the neutral voltage ripple magnitude is reduced to Δ. However, when used alone, neither Pattern A nor Pattern B evenly distributes losses among the four switches Q1-Q4. Thus combinations of Patterns A, B, and/or C/D may be used to further enhance converter operation.

Figure 6A:
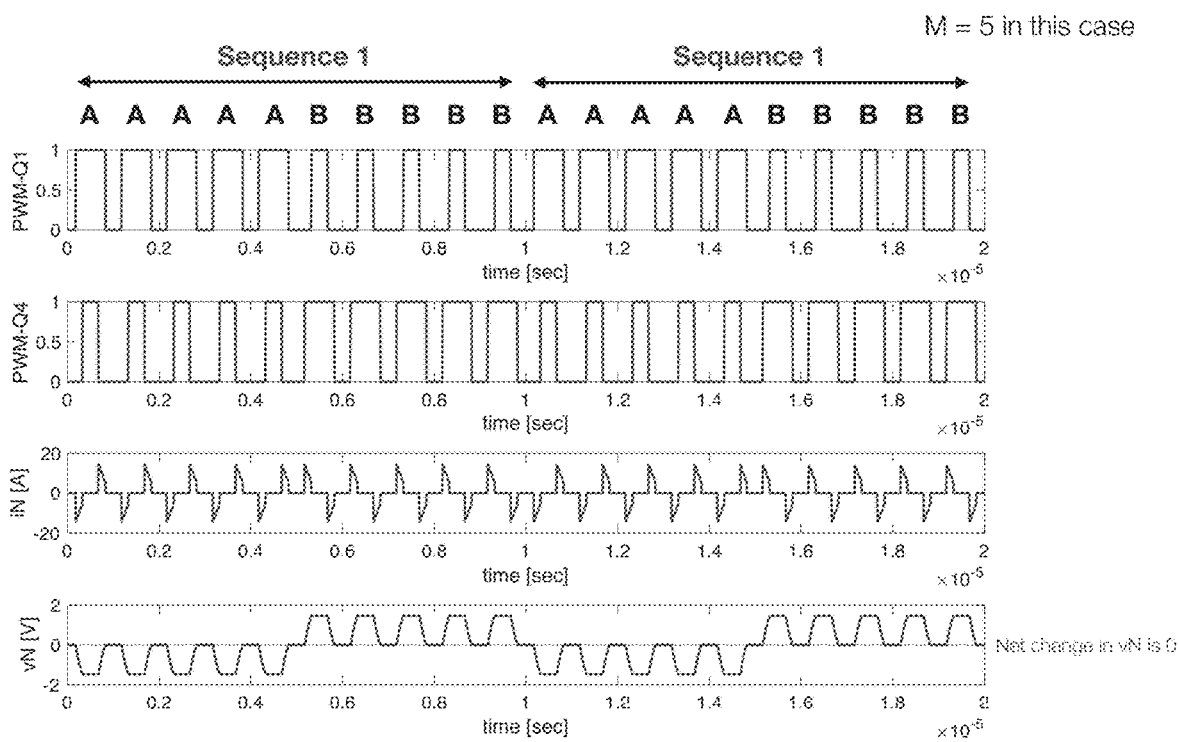
FIG. 6A-6C illustrates the additional waveforms corresponding to combinations of the switching sequences as described above.

For example, enhanced sequences including various combinations of the above described patterns of switching states may be employed. As an example, a first sequence ("Sequence 1") may include an arbitrary number M of repeated switching Patterns A, followed by an equal number of repeated switching Patterns B. One example of such a sequence is illustrated in FIG. 6A, in which various waveforms of Sequence 1 made up of 5 Patterns A followed by 5 Patterns B is illustrated. Although M=5 repeated patterns are used, any number of repeated patterns may be used. FIG. 6A generally corresponds to FIGS. 3B, 4B, and 5B, discussed above. FIG. 6A illustrates when PWM switching is enabled for switches Q1 and Q4, with the understanding that switches Q1 and Q2 are operated complementarily and Q3 and Q4 are operated complementarily, as described above. FIG. 6A also shows the alternating negative and positive neutral current pulses. Finally, FIG. 6A also shows the neutral voltage ripple, which has no net change, and a ripple value of Δ.

One advantage of Sequence 1, as described above, is that the equal number of Patterns A and Patterns B effectively equalizes the losses among switches Q1-Q4. Additionally, because Sequence 1 alone does not produce any change in the neutral voltage, it does not contribute to voltage imbalance between the input capacitors. However, as a result, Sequence 1 also cannot contribute to resolving a voltage imbalance caused by other effects, such as component tolerances, non-ideal switching, and the like. To address this issue, additional sequences ("Sequence 2" and "Sequence 3") may be introduced to allow for adjustment of the neutral voltage.

Figure 6B:
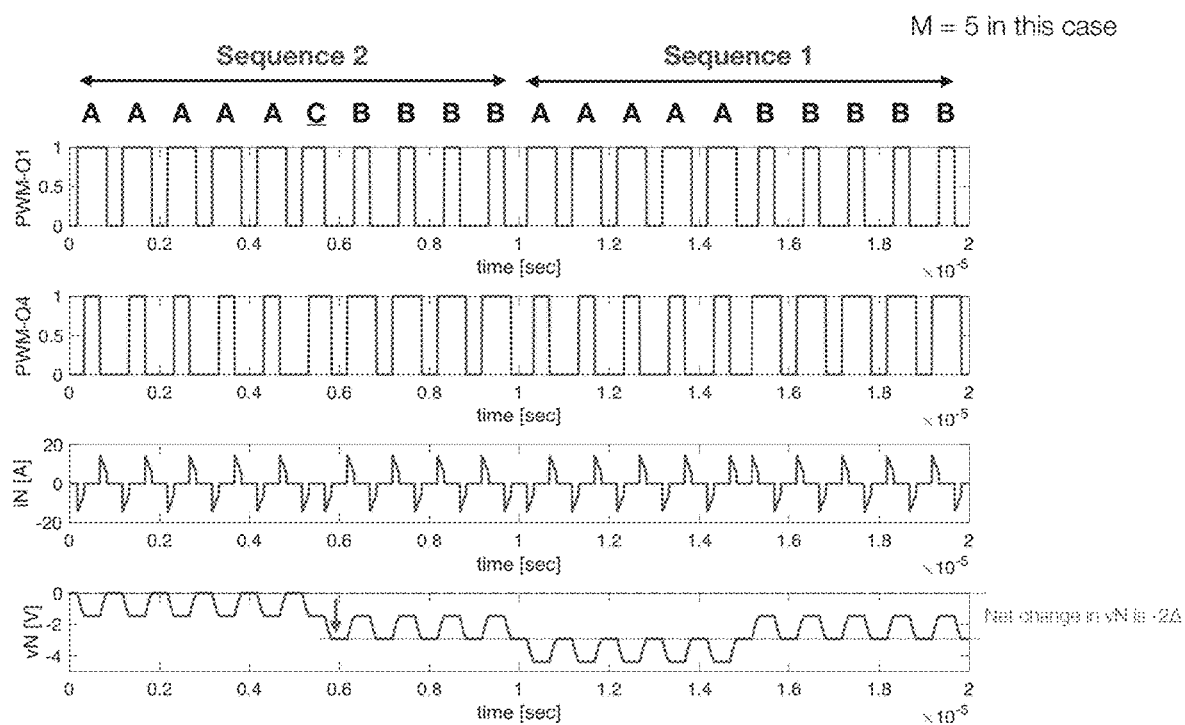

Sequence 2 may be similar to Sequence 1 in that includes an arbitrary number M of repeated Patterns A followed by an equal number of Patterns B, except that the first Pattern B in each sequence may be replaced with a Pattern C. This can result in a small perturbation of the neutral voltage, which may be used to reduce any input capacitor imbalance resulting from non-ideal factors in operation of the circuit. FIG. 6B illustrates Sequence 2 followed by Sequence 1. FIG. 6B generally corresponds to FIGS. 3B, 4B, 5B, and 6A discussed above. FIG. 6B illustrates when PWM switching is enabled for switches Q1 and Q4, with the understanding that switches Q1 and Q2 are operated complementarily and Q3 and Q4 are operated complementarily, as described above. FIG. 6B also shows the alternating negative and positive neutral current pulses, with the C Pattern inserted in place of the first B Pattern resulting in a double negative neutral current pulse that lowers the neutral voltage by an increment Δ.

Figure 6C:
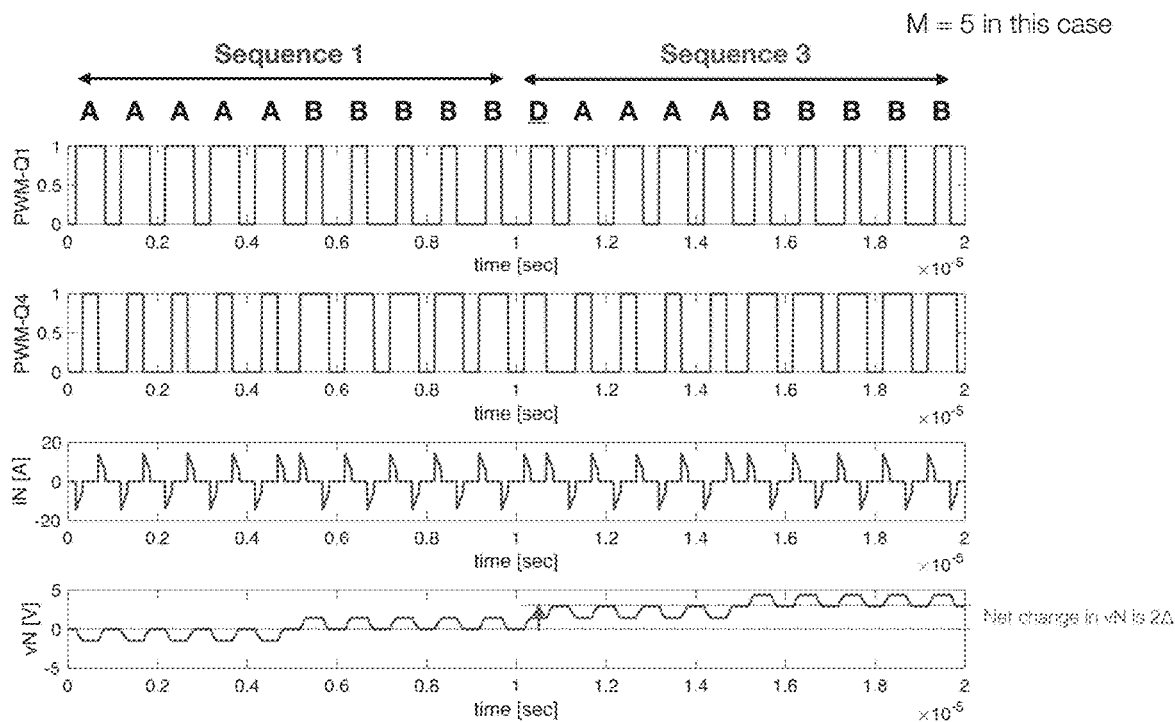

Sequence 3 may also be similar to Sequence 1 in that includes an arbitrary number M of repeated Patterns A followed by an equal number of Patterns B, except that the first Pattern A in each sequence may be replaced with a Pattern D. This can result in a small perturbation of the neutral voltage, which may be used to reduce any input capacitor imbalance resulting from non-ideal factors in operation of the circuit. This small perturbation will be in the opposite direction of that produced by Sequence 2, discussed above. FIG. 6C illustrates Sequence 1 followed by Sequence 3. FIG. 6C generally corresponds to FIGS. 3B, 4B, 5B, 6A, and 6B discussed above. FIG. 6C illustrates when PWM switching is enabled for switches Q1 and Q4, with the understanding that switches Q1 and Q2 are operated complementarily and Q3 and Q4 are operated complementarily, as described above. FIG. 6C also shows the alternating negative and positive neutral current pulses, with the D Pattern inserted in place of the first A Pattern resulting in a double positive neutral current pulse that increases the neutral voltage by an increment Δ.

The above described Sequences 1, 2, and 3 may thus be made up of various combinations of switching Patterns A, B, C, and D. The Patterns A-D may be made up of various combinations of the switching States 1, 2, 3, and 4. In operation, Sequences 1, 2, and 3 may be used continuously in any combination to achieve the desired operation. For example, Sequence 1 may be employed continuously so long as the input voltage remains balanced across the input capacitors. This can allow for reduced neutral voltage ripple (Δ vs. 2Δ), while the alternation between successive Patterns A and B can equalize losses across all four switching devices. If a voltage imbalance develops across the input capacitors, one or more Sequences 1 or 2 may be introduced as necessary to restore the voltage balance across the input capacitors. As described above with reference to FIG. 2A, the converter controller may monitor the neutral voltage vN to facilitate this operation.

AC-AC Applications

Figure 7A:
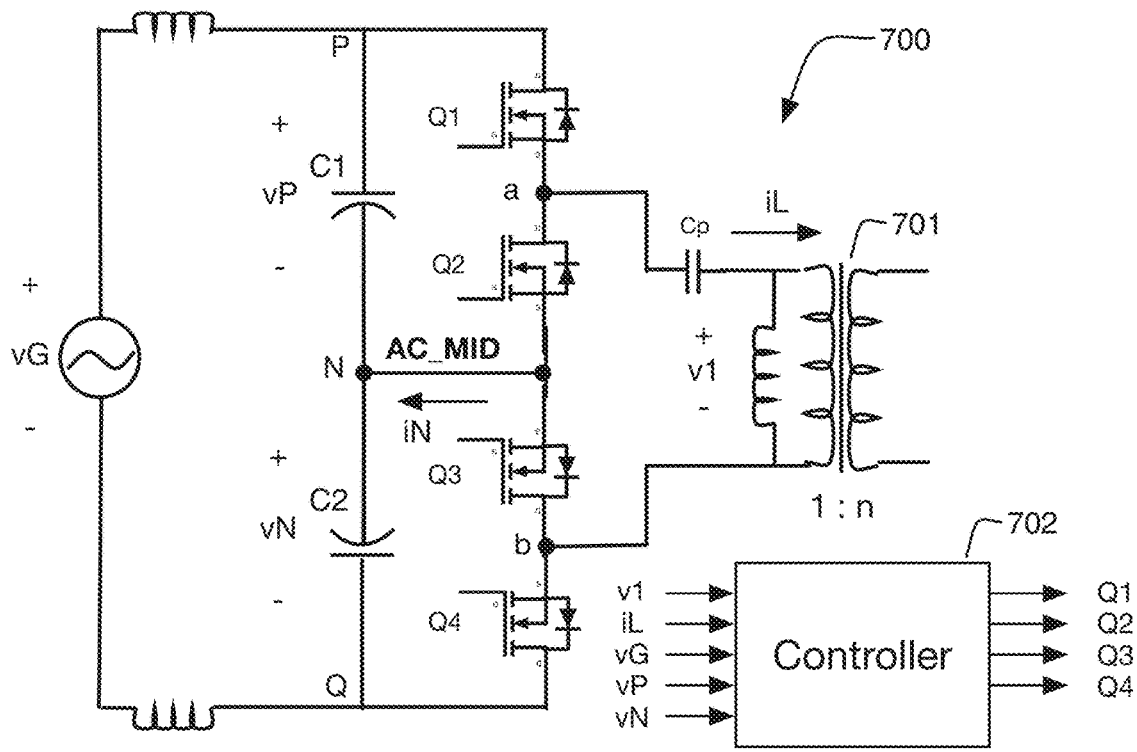
FIG. 7A-7B illustrate a schematic depiction of a stacked half bridge AC-AC converter and various switching states of a stacked half bridge AC-AC converter.

FIG. 7A illustrates an exemplary stacked half bridge AC-AC converter 700, which is one type of converter that may be used in the above described (or other) applications as appropriate. As the name suggests, stacked half bridge converter 200 includes stacked half bridge switching arrangements, first/upper half bridge including switching devices Q1 and Q2 and a second/lower half bridge including switching devices Q3 and Q4. In the illustrated embodiment, the upper half bridge switching devices are n-channel MOSFETs, and the lower half bridge switching devices are p-channel MOSFETs, although other types of switching devices may be used as appropriate for a given embodiment. Distinguishing the AC-AC example of FIG. 7A from the DC-DC example discussed above, the devices in the lower half bridge are of opposite polarity to deal with the negative half cycle of the AC input voltage vG.

Otherwise, as above, the half bridges are "stacked" in that they are connected in a ladder configuration across an AC input, which may, for example, be supplied by a connection to the AC mains. A first terminal P of the upper half bridge may be coupled to one line or terminal of the input AC voltage, and a first terminal Q of the lower half bridge may be coupled to the other line or terminal of the input AC voltage. The second terminal of the first half bridge may be coupled to the second terminal of the second half bridge, which may be coupled to a neutral point N (being the neutral of the AC output voltage). Input capacitors C1 and C2 may be provided between terminals P and N and G and N, respectively. The switched nodes of the upper and lower half bridges may be coupled to a transformer 701 via a blocking capacitor Cp and an inductor L.

Switches Q1-Q4 may be alternately opened and closed in various combinations or switching states, which are discussed in greater detail below with reference to FIG. 7B. Operation of switches Q1-Q4 may be performed by a controller 702. Controller 702 may take a variety of forms, including analog control circuitry, digital control circuitry, hybrid analog-digital control circuitry, and/or programmable circuitry in the form of a microcontroller or other programmed processor. Controller 702 may be configured with suitable control loops and/or logic to operate switches Q1-Q4 to provide suitable regulation of one or more circuit parameters, such as output voltage, output current, etc. responsive to various control inputs.

In the illustrated embodiment, controller 702 can receive five inputs, which are schematically depicted in FIG. 7A. Voltage v1 is the output voltage of the stacked half bridge converter, appearing across the primary winding of transformer 701. Load current iL is the output current of the converter flowing through the transformer primary winding. Voltage vN is the voltage of neutral point N, which may, as described below, be manipulated to reduce switching losses. Current iN is the current injected into the neutral point N. Controller 702 may be configured to produce four outputs Q1-Q4 corresponding to drive signals for the switching devices Q1-Q4.

The drive signals for switching devices Q1-Q4 may be used to generate the desired output for the converter. More specifically, controlling the timing of the switching events can control the output voltage, output current, or other parameters of the converter. For example, the switches may be operated using any of a variety of duty cycle, frequency, or other timing based control, such as pulse width modulation (PWM), pulse frequency modulation (PFM), or other suitable control techniques. For purposes of the following description, pulse width modulation (PWM) will be assumed.

Figure 7B:
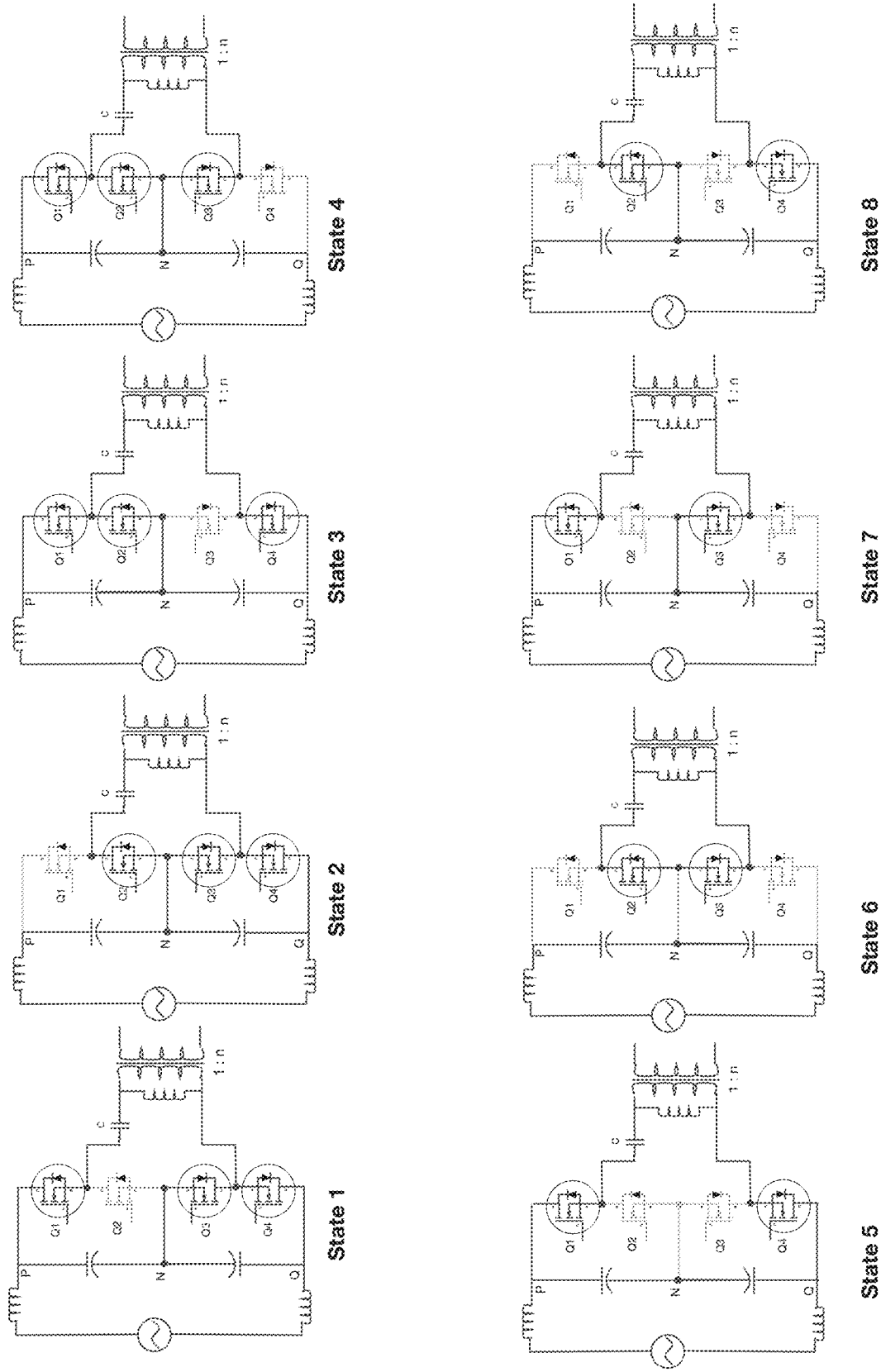

FIG. 7B illustrates eight switching states that may be used by the controller to operate the stacked half bridge AC-AC converter of FIG. 7A as an AC to AC converter. In State 1, upper switch Q1 of the upper half bridge is activated, as both switches Q3 and Q4 of the lower half bridge. By activated, it is meant that the switches are operated with a suitable modulation (such as pulse width modulation) to suitably regulate the output voltage, output current, or other controlled parameter. The on-off timing and duration of the activated switch pair will be determined by the controller and may vary depending on the particular controller implementation. Switch Q2 is deactivated in State 1. By deactivated, it is meant that it is left off and not modulated in the referenced state In State 2, lower switch Q2 of the upper half bridge and both switches Q3 and Q4 of the lower half bridge are activated, with switch Q1 being deactivated. In State 3, both switches Q1 and Q2 of the upper half bridge are activated, as is switch Q4 of the lower half bridge. Switch Q3 is deactivated. In State 4, both switches Q1 and Q2 of the upper half bridge are activated, as is switch Q3 of the lower half bridge. Switch Q4 is deactivated. In State 5, switch Q1 of the upper half bridge and switch Q4 of the lower half bridge are activated, with switches Q2 and Q3 being deactivated. In State 6, switch Q2 of the upper half bridge and switch Q3 of the lower half bridge are activated, with switches Q1 and Q4 being deactivated. In State 7, switch Q1 of the upper half bridge and switch Q3 of the lower half bridge are activated, with switches Q2 and Q4 being deactivated. In State 8, switch Q2 of the upper half bridge and switch Q4 of the lower half bridge are activated, with switches Q1 and Q3 being deactivated.

As discussed in greater detail below with respect to FIGS. 3-6, these switching states may be combined into various patterns, with the various patterns being combined into switching sequences, with differing switching sequences employed to improve converter operation. For example, States 1-4 all allow for zero voltage switching (ZVS), which can reduce switching losses of the converter. However, States 1-4 can result in unbalanced currents that can cause increased conduction losses. Conversely, States 5-8 have reduced conduction losses by virtue of equalizing the currents as discussed in greater detail below. However, States 5-8 require hard (non-ZVS) switching of at least certain switches in operation. Nonetheless, these various advantages and disadvantages may be selectively combined for different converter operating conditions to optimize converter operation, as described in greater detail below.

In each of the switching states, the AC input voltage appears across the series combination of input capacitors C1 and C2, which are connected across the input with their junction joined with the junction of the upper and lower half bridges. This junction forms the neutral point of the AC output of the AC-AC converter. In certain of the switching states described above, switching losses are directly related to the voltages appearing across the operating switches, which is also the voltage across the corresponding input capacitors. Thus, in at least some operating states, it may be desirable to temporarily reduce the voltage across one or the other of the input capacitors to reduce the associated switching losses.

Figure 8:
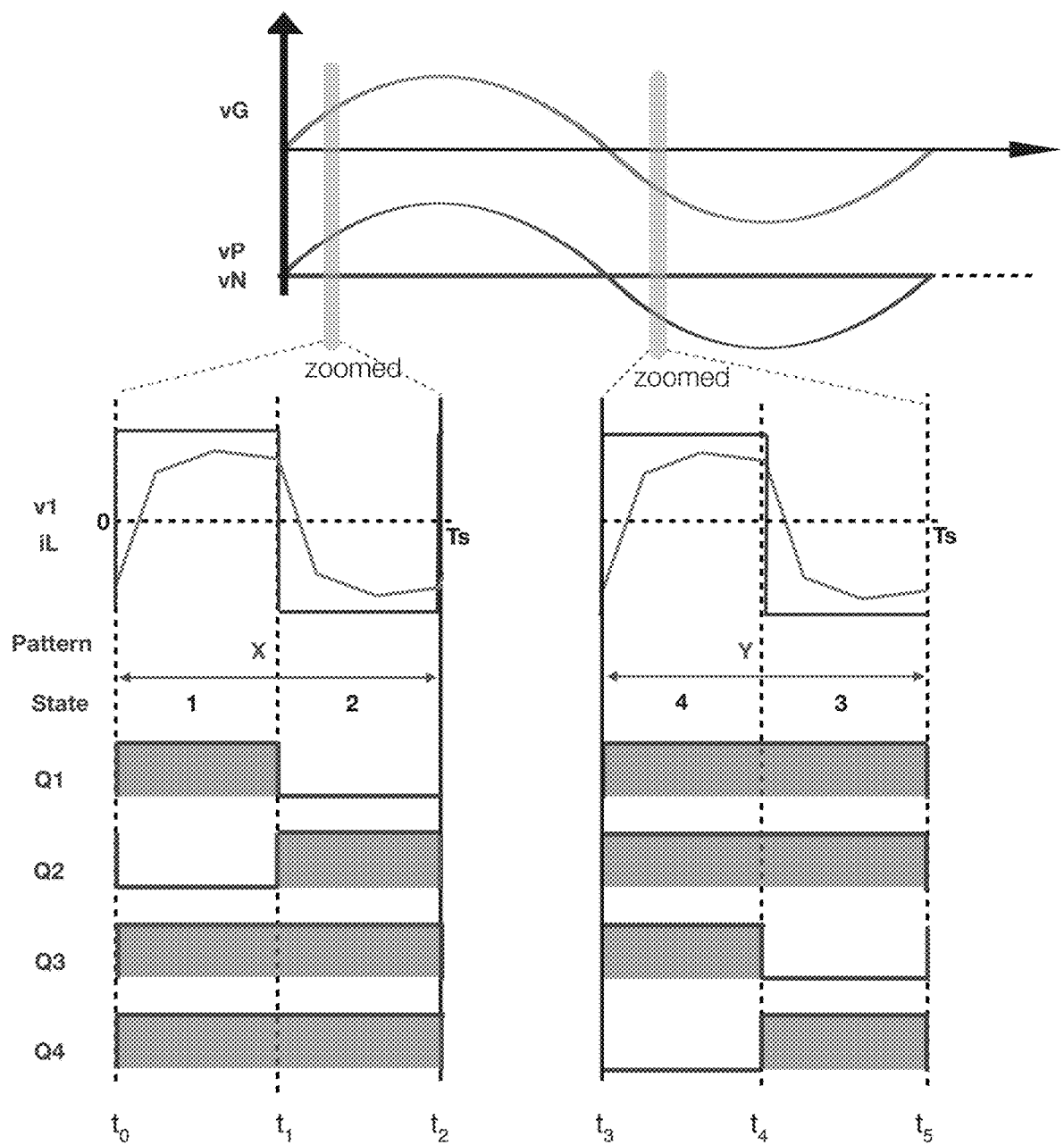
FIG. 8 illustrates various waveforms corresponding to a first sequence of switching states of a stacked half bridge AC-AC converter.

FIG. 8 illustrates various waveforms associated with a first switching sequence. The switching sequence comprises two switching Patterns X and Y. Switching Pattern X includes states 1 and 2, as described above with reference to FIG. 7B. Switching Pattern Y includes states 4 and 3, as described above with reference to FIG. 7B. FIG. 8 illustrates two full switching periods, each having length Ts; the first corresponding to the positive half cycle of the AC input waveform vG, and the second corresponding to the negative half cycle. In the first switching period/positive half cycle, Pattern X is applied. In the second switching period/negative half cycle, Pattern Y is applied. In the upper traces, a complete cycle of the AC input waveform is shown, with the corresponding input capacitor voltages vP and vN (labeled in FIG. 7A). During the positive half cycle, vP tracks the input voltage, while vN is zero. During the negative half cycle, vN tracks the input voltage, while vP is zero.

The converter waveforms for an illustrated slice of the positive half cycle are depicted in the left half of the lower portion of FIG. 8, and the converter waveforms for an illustrated slice of the negative half cycle are depicted in the right half of the lower portion of FIG. 8. In the lower half of FIG. 8, the upper traces depict the AC output voltage v1 and AC output current iL that are applied to the primary winding of the transformer. (The locations of voltage v1 and current iL are identified in FIG. 7A.) Below this, the pattern identification for each switching period and corresponding switching states are identified. Below this, the states of switching devices Q1 through Q4 are illustrated, with a high signal indicating that the switch is activated and a low signal indicating that the switch is deactivated.

In the positive half cycle, beginning at time t0, the converter may begin switching Pattern X, which corresponds to alternating between States 1 and 2. At time t0, State 1 begins, in which switches Q1, Q3, and Q4 are activated, and switch Q2 is deactivated. As a result, a negative current iL that is flowing in the transformer primary winding begins increasing (i.e., becoming less negative), eventually becoming positive, and the instantaneous AC input voltage v1 is applied to the primary winding. At time t1, the converter switches to State 2, still part of Pattern X. In this state, Q2, Q3, and Q4 are activated, with Q1 deactivated. This applies the negative of the instantaneous AC input voltage across the transformer primary winding (v1) and causes the output current iL to decrease sharply, eventually becoming negative. At time t2, Pattern X is complete and continues repeating continuously during the positive half cycle.

In the negative half cycle, beginning at time t3, the converter switches to State 4, part of Pattern Y. In this state, switches Q1, Q2, and Q3 are activated, with Q4 deactivated. As a result, a negative current iL that is flowing in the transformer primary winding begins increasing (i.e., becoming less negative), eventually becoming positive, and the negative of the instantaneous AC input voltage v1 is applied to the primary winding. At time t4, the converter switches to State 3, still part of Pattern Y. In this state, switches Q1, Q2, and Q4 are activated, with Q3 deactivated. This applies the instantaneous AC input voltage across the transformer primary winding (v1) and causes the output current iL to decrease sharply, eventually becoming negative. At time t5, Pattern Y is complete and continues repeating continuously during the negative half cycle of the AC input waveform.

One characteristic of the above-described operation is that the voltage across each input capacitor is zero for half of the input AC line cycle. Another characteristic is a large injected neutral current iN caused by the unequal current split between the inner switching devices (Q2, Q3) versus the outer switching devices (Q1, Q4). More specifically, in the positive half line cycle, Q4 has a higher impedance path than Q3. Similarly, in the negative half cycle, Q1 has a higher impedance path than Q2, resulting in higher currents and higher temperatures in switch Q2. Exemplary high frequency current paths are illustrated in FIG. 9B, blocks (a) and (b). FIG. 9B block (a) illustrates the high frequency current path for switch Q4 when switch Q2 is on. Similarly, FIG. 9B block (b) illustrates the high frequency current path for switch Q4 when switch Q1 is on. The uneven heating and associated efficiency effects of this difference in current path impedance may be mitigated in two different ways. The first way involves a topological change to the circuit and is discussed above with respect to FIGS. 9A and 9B blocks (c) and (d). The second way involves alternate switching sequences and is discussed below with respect to FIGS. 10A-11.

Figure 9A:
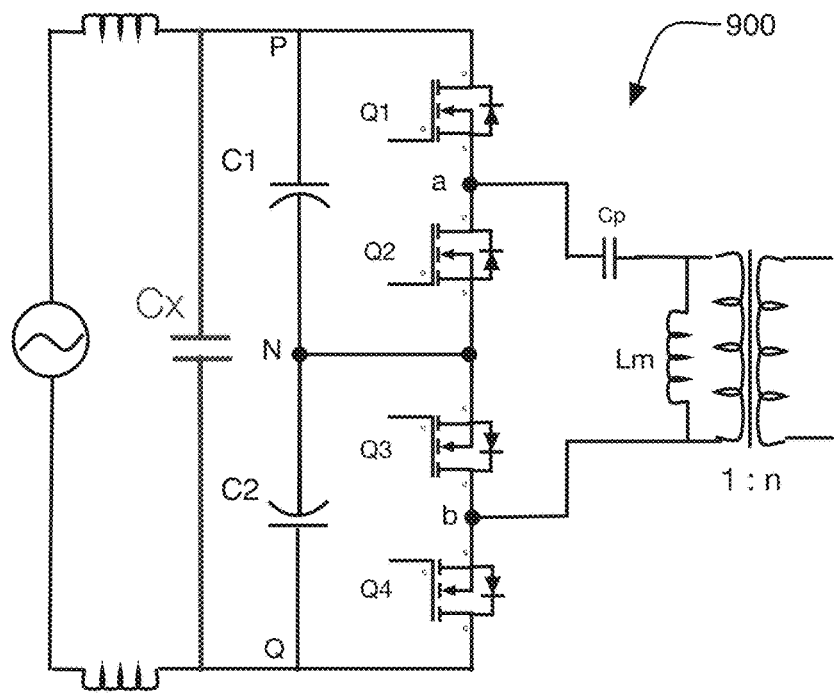
FIGS. 9A-9B illustrate an alternative configuration of a stacked half bridge AC-AC converter with alternate high frequency current paths.
Figure 9B:
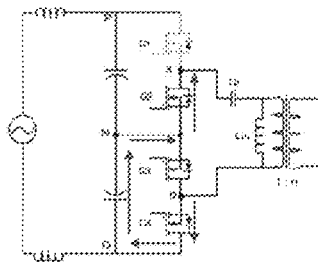
Figure 9B:
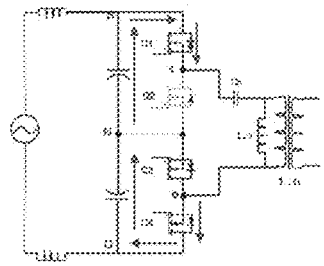
Figure 9B:
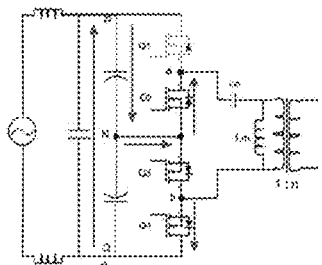
Figure 9B:
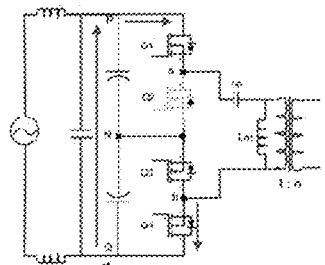

FIG. 9A illustrates an improved stacked half bridge AC-AC converter 900 that is substantially identical to converter 700 of FIG. 7A except for the addition of an additional input capacitor Cx coupled across the AC input. In distinction with input capacitors C1 and C2, which are series connected across the input with their junction point joined to the junction point of the upper and lower half bridges, input capacitor Cx is connected directly across the input. This alters the high frequency current path of the converter, as illustrated in FIG. 9B blocks (c) and (d). FIG. 9B block (c) illustrates the high frequency current path for switch Q4 when switch Q2 is on. Similarly, FIG. 9B block (d) illustrates the high frequency current path for switch Q4 when switch Q1 is on. As illustrated, the additional input capacitor Cx provides an additional current path that equalizes the current between the inner and outer switch pairs. By proper selection of the capacitor value, the current through each switch may be almost totally equalized. However, one drawback of this topological solution are the cost and space requirements for additional input capacitor Cx. Thus, for at least some applications, the switching sequence modifications discussed below may be preferable.

Figure 10A:
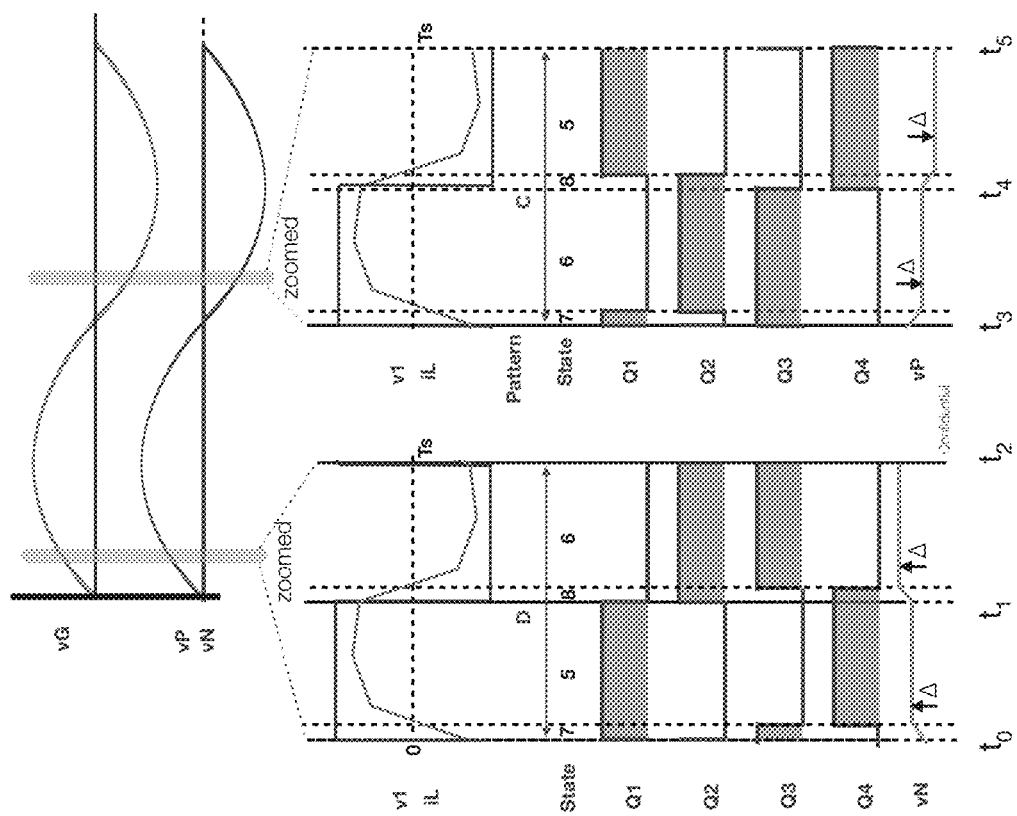
FIG. 10A-10C illustrate various waveforms corresponding to alternative sequences of switching states of a stacked half bridge AC-AC converter.

As with the DC-AC converter discussed above, the switching states of FIG. 7B may be combined into switching patterns, with the patterns being combined into sequences to achieve a desired effect. A first switching Sequence 1 that can address the current imbalance issues of the AC-AC converter discussed above, without the topological modifications of FIG. 9A, is illustrated in FIG. 10A, which generally corresponds to FIG. 8, discussed above. Switching Sequence 1 comprises two switching Patterns A and B. Switching Pattern A includes State 5 followed by State 6. Switching Pattern B includes State 6, followed by State 5. FIG. 10A illustrates two full switching periods, each having length Ts; the first corresponding to the positive half cycle of the AC input waveform vG, and the second corresponding to the negative half cycle. In the first switching period/positive half cycle, Pattern A is applied. In the second switching period/negative half cycle, Pattern B is applied. (This may be reversed, with Pattern A applied in the negative half cycle and Pattern B applied in the positive half line cycle).

In the upper traces, a complete cycle of the AC input waveform is shown, with the corresponding input capacitor voltages vP and vN (labeled in FIG. 7A). As distinguished from the Sequence of FIG. 8, vP and vN both track the input during the full cycle, although with a DC offset. More specifically, vP ranges between 0 and Vpeak, effectively having a positive DC offset, and vN ranges between 0 and −Vpeak, effectively having a negative DC offset.

The converter waveforms for an illustrated slice of the positive half cycle are depicted in the left half of the lower portion of FIG. 10A, and the converter waveforms for an illustrated slice of the negative half cycle are depicted in the right half of the lower portion of FIG. 10A. In the lower half of FIG. 10A, the upper traces depict the AC output voltage v1 and AC output current iL that are applied to the primary winding of the transformer. (The locations of voltage v1 and current iL are identified in FIG. 7A.) Below this, the pattern identification for each switching period and corresponding switching states are identified. Below this, the states of switching devices Q1 through Q4 are illustrated, with a high signal indicating that the switch is activated and a low signal indicating that the switch is deactivated. Finally, the input capacitor voltage vN and vP are illustrated for the positive and negative half cycle, respectively.

In the positive half cycle, beginning at time t0, the converter may begin switching Pattern A, which corresponds to alternating between States 5 and 6. At time t0, State 5 begins, in which switches Q1 and Q4 are activated, with switches Q2 and Q3 are deactivated. As a result, a negative current iL that is flowing in the transformer primary winding begins increasing (i.e., becoming less negative), eventually becoming positive, and the instantaneous AC input voltage v1 is applied to the primary winding. At time t1, the converter switches to State 6, still in Pattern A. In this state, switches Q2 and Q3 are activated, with switches Q1 and Q4 deactivated. This applies the negative of the instantaneous AC input voltage across the transformer primary winding (v1) and causes the output current iL to decrease sharply, eventually becoming negative. At time t2, Pattern A is complete and may be repeated for the duration of the half line cycle. Input capacitor voltage vN remains substantially constant during the switching period, as no neutral current is injected by Sequence B.

In the negative half cycle, beginning at time t3, the converter switches to State 6, part of Pattern B. In this state, switches Q2 and Q3 are activated, with Q1 and Q4 deactivated. As a result, a negative current iL that is flowing in the transformer primary winding begins increasing (i.e., becoming less negative), eventually becoming positive, and the negative of the instantaneous AC input voltage v1 is applied to the primary winding. At time t4, the converter switches to State 5, still part of Pattern B. In this state, switches Q1 and Q4 are activated, with switches Q2 and Q3 deactivated. This applies the instantaneous AC input voltage across the transformer primary winding (v1) and causes the output current iL to decrease sharply, eventually becoming negative. At time t5, Pattern B is complete and may be repeated for the duration of the half line cycle. Input capacitor voltage vP remains substantially constant during the switching period, as no neutral current is injected by Sequence B.

As noted above, Patterns A and B alternate during line half cycles. Pattern A and Pattern B result in no injected neutral current iN and an equal current split between the inner switching devices Q2 and Q3 and the outer switching devices Q1 and Q4. However, as noted above, Patterns A and B do result in 50% of the switching events being hard switching (i.e., not ZVS switching).

Figure 10B:
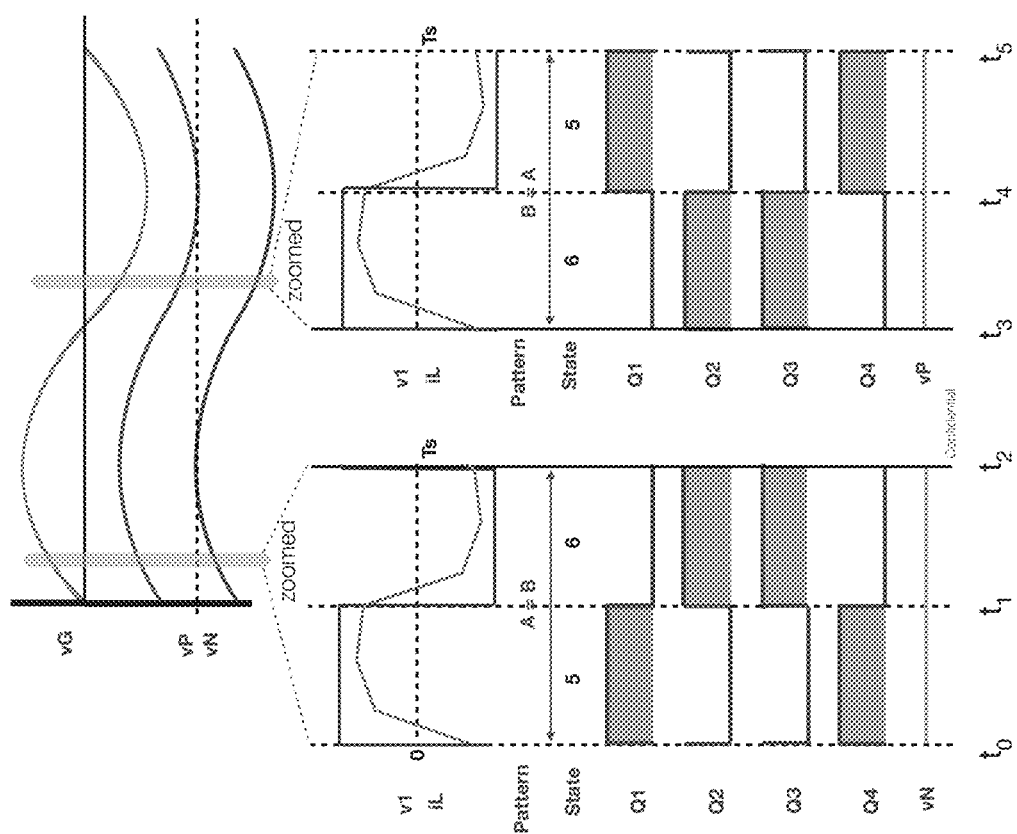

A second switching Sequence 2 that can address the current imbalance issues of the AC-AC converter discussed above, without the topological modifications of FIG. 9A, is illustrated in FIG. 10B, which generally corresponds to FIGS. 8 and 10A, discussed above. Switching Sequence 2 comprises two switching Patterns D and C. Switching Pattern D includes States 7, 5, 8, and 6. Switching Pattern C includes States 7, 6, 8, and 5. Pattern D is thus similar to Pattern A with additional States 7 and 8 inserted before States 5 and 6, respectively. Similarly, Pattern C is thus similar to Pattern B with additional states 7 and 8 inserted before States 6 and 5, respectively.

FIG. 10B illustrates two full switching periods, each having length Ts; the first corresponding to the positive half cycle of the AC input waveform vG, and the second corresponding to the negative half cycle. In the first switching period/positive half cycle, Pattern D is applied. In the second switching period/negative half cycle, Pattern C is applied.

In the upper traces, a complete cycle of the AC input waveform is shown, with the corresponding input capacitor voltages vP and vN (labeled in FIG. 7A). Like the sequence of FIG. 8, and as distinguished from Sequence 1 of FIG. 10A, in Sequence 2, during the positive half cycle, vP tracks the input voltage, while vN is zero. During the negative half cycle, vN tracks the input voltage, while vP is zero.

The converter waveforms for an illustrated slice of the positive half cycle are depicted in the left half of the lower portion of FIG. 10B, and the converter waveforms for an illustrated slice of the negative half cycle are depicted in the right half of the lower portion of FIG. 10B. In the lower half of FIG. 10B, the upper traces depict the AC output voltage v1 and AC output current iL that are applied to the primary winding of the transformer. (The locations of voltage v1 and current iL are identified in FIG. 7A.) Below this, the pattern identification for each switching period and corresponding switching states are identified. Below this, the states of switching devices Q1 through Q4 are illustrated, with a high signal indicating that the switch is activated and a low signal indicating that the switch is deactivated. Finally, the input capacitor voltage vN and vP are illustrated for the positive and negative half cycle, respectively.

In the positive half cycle, beginning at time t0, the converter may begin switching Pattern D, which corresponds to a sequence of States 7, 5, 8, and 6. At time t0, State 7 begins, in which switches Q1 and Q3 are activated, with switches Q2 and Q4 are deactivated. As a result, a negative current iL that is flowing in the transformer primary winding begins increasing (i.e., becoming less negative), eventually reaching zero, and the instantaneous AC input voltage v1 is applied to the primary winding. A short time after t0, when the load current iL reaches zero, State 5 begins, in which switches Q1 and Q4 are activated, with switches Q2 and Q3 being deactivated. During State 5, load current iL becomes positive and continues increasing, and the instantaneous AC input voltage v1 continues to be applied to the primary winding. At time t1, the converter switches to State 8, still in Pattern D. In this state, switches Q2 and Q4 are activated, with switches Q1 and Q3 deactivated. This applies the negative of the instantaneous AC input voltage across the transformer primary winding (v1) and causes the output current iL to decrease sharply, eventually becoming zero. A short time after t1, when the load current iL reaches zero, State 6 begins, in which switches Q1 and Q4 are activated, with switches Q2 and Q3 being deactivated. During State 6, load current iL becomes positive and continues increasing, and the negative of the instantaneous AC input voltage v1 continues to be applied to the primary winding. At time t2, Pattern D is complete and may then be repeated for the duration of the line half cycle. Input capacitor voltage vN is incrementally increased (by 2Δ) during Pattern D due to the non-zero injected neutral current iN.

In the negative half cycle, beginning at time t3, the converter may begin switching Pattern C, which corresponds to a sequence of States 7, 6, 8, and 5. At time t3, State 7 begins, in which switches Q1 and Q3 are activated, with switches Q2 and Q4 are deactivated. As a result, a negative current iL that is flowing in the transformer primary winding begins increasing (i.e., becoming less negative), eventually reaching zero, and the negative instantaneous AC input voltage v1 is applied to the primary winding. A short time after t0, when the load current iL reaches zero, State 6 begins, in which switches Q2 and Q3 are activated, with switches Q1 and Q4 being deactivated. During State 6, load current iL becomes positive and continues increasing, and the negative instantaneous AC input voltage v1 continues to be applied to the primary winding. At time t4, the converter switches to State 8, still in Pattern C. In this state, switches Q2 and Q4 are activated, with switches Q1 and Q3 deactivated. This applies the instantaneous AC input voltage across the transformer primary winding (v1) and causes the output current iL to decrease sharply, eventually becoming zero. A short time after t4, when the load current iL reaches zero, State 5 begins, in which switches Q1 and Q4 are activated, with switches Q2 and Q3 being deactivated. During State 5, load current iL becomes negative and continues decreasing, and the instantaneous AC input voltage v1 continues to be applied to the primary winding. At time t5, Pattern C is complete and may then be repeated for the duration of the line half cycle. Input capacitor voltage vP is incrementally decreased (by 2Δ) during Pattern D due to the non-zero injected neutral current iN.

Switching Sequence 2, made up of switching Patterns D and C in alternating line cycles may be used to discharge one or the input capacitors during the complementary line cycle to reduce switching losses associated with the switching modulation schemes used for converter control. Unlike Patterns A and B, Patterns C and D result in some injected neutral current (iN) flow, although smaller than in the switching sequence of FIG. 8. Nonetheless, if even lower injected neutral currents (iN) are desired, alternative switching sequences may be constructed in which Patterns D and C are combined with Patterns A and B to further reduce the average injected neutral current iN and thereby change the increment by which the input capacitor voltages are changed.

Figure 10C:
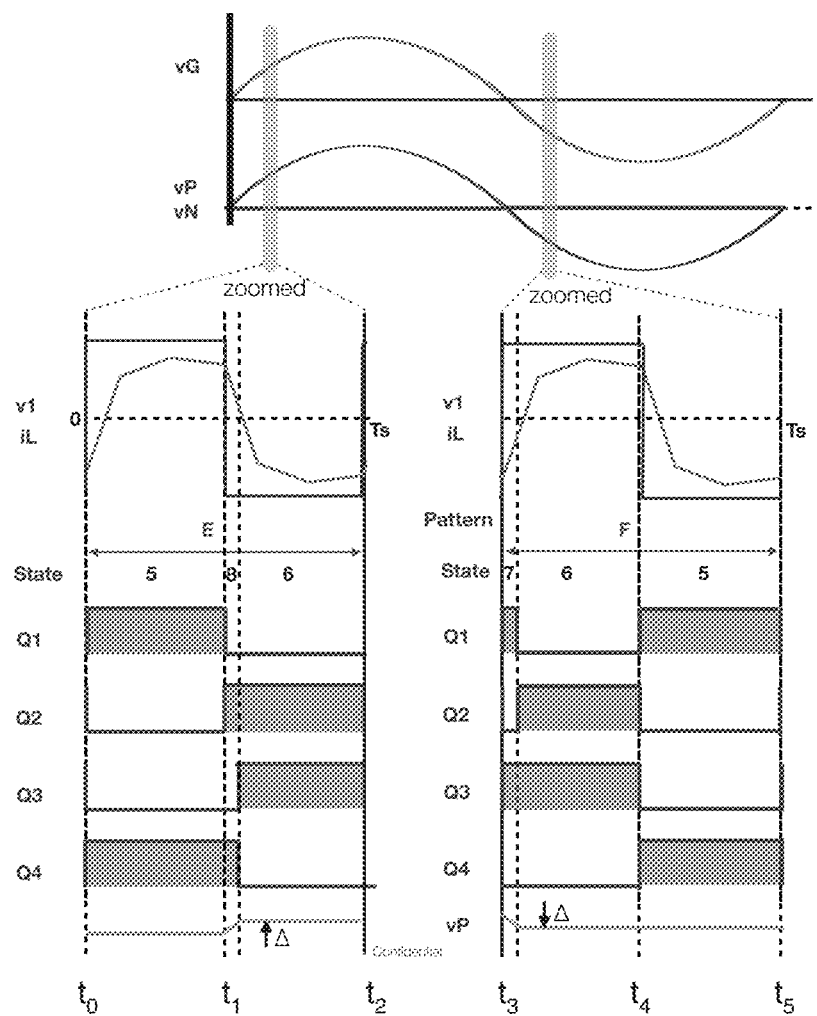

A third switching Sequence 3 that can address the current imbalance issues of the AC-AC converter discussed above, without the topological modifications of FIG. 9A, is illustrated in FIG. 10C, which generally corresponds to FIGS. 8, 10A, and 10B discussed above. Switching Sequence 3 comprises two switching Patterns E and F. Switching Pattern E includes States 5, 8, and 6. Switching Pattern F includes States 7, 6, and 5. Pattern E is thus similar to Pattern E with State 7 omitted, and Pattern F is thus similar to Pattern C with State 8 omitted.

FIG. 10C illustrates two full switching periods, each having length Ts; the first corresponding to the positive half cycle of the AC input waveform vG, and the second corresponding to the negative half cycle. In the first switching period/positive half cycle, Pattern E is applied. In the second switching period/negative half cycle, Pattern F is applied.

In the upper traces, a complete cycle of the AC input waveform is shown, with the corresponding input capacitor voltages vP and vN (labeled in FIG. 7A). Like the sequences of FIGS. 8 and 10B, and as distinguished from Sequence 1 of FIG. 10A, in Sequence 3, during the positive half cycle, vP tracks the input voltage, while vN is zero. During the negative half cycle, vN tracks the input voltage, while vP is zero.

The converter waveforms for an illustrated slice of the positive half cycle are depicted in the left half of the lower portion of FIG. 10C, and the converter waveforms for an illustrated slice of the negative half cycle are depicted in the right half of the lower portion of FIG. 10C. In the lower half of FIG. 10C, the upper traces depict the AC output voltage v1 and AC output current iL that are applied to the primary winding of the transformer. (The locations of voltage v1 and current iL are identified in FIG. 7A.) Below this, the pattern identification for each switching period and corresponding switching states are identified. Below this, the states of switching devices Q1 through Q4 are illustrated, with a high signal indicating that the switch is activated and a low signal indicating that the switch is deactivated. Finally, the input capacitor voltage vN and vP are illustrated for the positive and negative half cycle, respectively.

In the positive half cycle, beginning at time t0, the converter may begin switching Pattern E, which corresponds to a sequence of States 5, 8, and 6. At time t0, State 5 begins, in which switches Q1 and Q4 are activated, with switches Q2 and Q3 are deactivated. As a result, a negative current iL that is flowing in the transformer primary winding begins increasing (i.e., becoming less negative), eventually becoming positive, and the instantaneous AC input voltage v1 is applied to the primary winding. At time t1, the converter switches to State 8, still in Pattern E. In this state, switches Q2 and Q4 are activated, with switches Q1 and Q3 deactivated. This applies the negative of the instantaneous AC input voltage across the transformer primary winding (v1) and causes the output current iL to decrease sharply, eventually becoming zero. A short time after t1, when the load current iL reaches zero, State 6 begins, in which switches Q1 and Q4 are activated, with switches Q2 and Q3 being deactivated. During State 6, load current iL becomes negative and continues decreasing, and the negative of the instantaneous AC input voltage v1 continues to be applied to the primary winding. At time t2, Pattern E is complete and may then be repeated for the duration of the line half cycle. Input capacitor voltage vN is incrementally increased (by Δ) during Pattern E due to the non-zero injected neutral current iN.

In the negative half cycle, beginning at time t3, the converter may begin switching Pattern F, which corresponds to a sequence of States 7, 6, and 5. At time t3, State 7 begins, in which switches Q1 and Q3 are activated, with switches Q2 and Q4 are deactivated. As a result, a negative current iL that is flowing in the transformer primary winding begins increasing (i.e., becoming less negative), eventually reaching zero, and the negative instantaneous AC input voltage v1 is applied to the primary winding. A short time after t3, when the load current iL reaches zero, State 6 begins, in which switches Q2 and Q3 are activated, with switches Q1 and Q4 being deactivated. During State 6, load current iL becomes positive and continues increasing, and the negative instantaneous AC input voltage v1 continues to be applied to the primary winding. At time t4, State 5 begins, in which switches Q1 and Q4 are activated, with switches Q2 and Q3 being deactivated. During State 5, load current iL continues decreasing, becoming, and the instantaneous AC input voltage v1 continues to be applied to the primary winding. At time t5, Pattern F is complete and may then be repeated for the duration of the line half cycle. Input capacitor voltage vP is incrementally decreased (by 2Δ) during Pattern F due to the non-zero injected neutral current iN.

Switching Sequence 3, made up of switching Patterns E and F in alternating line cycles may be used to discharge one or the input capacitors during the complementary line cycle to reduce switching losses associated with the switching modulation schemes used for converter control. Unlike Patterns A and B, and like Patterns D and C, Patterns E and F result in some injected neutral current (iN) flow, although smaller than in the switching sequence of FIG. 8. Nonetheless, if even lower injected neutral currents (iN) are desired, alternative switching sequences may be constructed in which Patterns E and F are combined with Patterns A and B to further reduce the average injected neutral current iN and thereby change the increment by which the input capacitor voltages are changed.

The above described Sequences 1, 2, and 3 may thus be made up of various combinations of switching Patterns A-E. The Patterns A-D may be made up of various combinations of the switching States 1-8. In operation, Sequences 1, 2, and 3 may be used continuously in any combination to achieve the desired operation by combining the various switching loss versus conduction loss characteristics of the respective states.

The foregoing describes exemplary embodiments of improved switching schemes for stacked half bridge converters. Such systems may be used in a variety of applications but may be particularly advantageous when used in conjunction with relatively high voltage and/or high power systems, such as may be used in electric vehicles, grid storage batteries, photovoltaic systems, and the like. Although numerous specific features and various embodiments have been described, it is to be understood that, unless otherwise noted as being mutually exclusive, the various features and embodiments may be combined various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

The invention claimed is:

1. A stacked half-bridge AC-AC converter comprising:
a first half bridge including a first switching device and a second switching device, wherein a junction point of the first and second switching devices is coupled to a first AC output terminal of the converter;
a second half bridge including a third switching device and a fourth switching device, wherein a junction point of the third and fourth switching devices is coupled to a second AC output terminal of the converter and wherein the first and second half bridges are connected in a ladder configuration across an AC input of the converter;
first and second input capacitors connected in a ladder configuration across the AC input of the converter, wherein a junction point of the first and second capacitors is connected to a junction point of the first and second half bridges forming a neutral point of the converter; and
a controller configured to operate the switching devices according to a plurality of switching sequences, each switching sequence including one or more switching patterns, and each switching pattern including a plurality of switching states, each switching state including pulse width modulated operation of at least one switching device from each of the first and second half bridges, wherein:
at least one of the plurality of switching sequences includes one or more patterns of switching states selected to inject current into the neutral point to regulate a voltage of the neutral point, reduce switching losses, or equalize losses among the switching devices.

2. The stacked half-bridge AC-AC converter of claim 1 wherein:
at least one of the plurality of switching sequences injects positive current into the neutral point to increase the voltage of the neutral point; and
at least one switching sequence is selected to inject negative current into the neutral point to decrease the voltage of the neutral point.

3. The stacked half-bridge AC-AC converter of claim 1 wherein the plurality of switching states include one or more of:
a first switching state in which the first, third, and fourth switching devices are operated;
a second switching state in which the second, third, and fourth switching devices are operated;
a third switching state in which the first, second, and fourth switching devices are operated;
a fourth switching state in which the first, second, and third switching devices are operated;
a fifth switching state in which the first and fourth switching devices are operated;
a sixth switching state in which the second and third switching devices are operated;
a seventh switching state in which the first and third switching devices are operated; and
an eighth switching state in which second and fourth switching devices are operated.

4. The stacked half-bridge AC-AC converter of claim 3 wherein the one or more switching patterns include one or more of:
a first switching pattern operable during alternating half cycles of an AC input waveform, the first switching pattern consisting of repeated alternation of the fifth switching state followed by the sixth switching state; and
a second switching pattern operable during alternating half cycles of the AC input waveform, the second switching pattern consisting of repeated alternation of the sixth switching state followed by the fifth switching state.

5. The stacked half-bridge AC-AC converter of claim 4 wherein the first switching pattern is operable during positive half cycles of the AC input waveform and the second switching pattern is operable during negative half cycles of the AC input waveform.

6. The stacked half bridge AC-AC converter of claim 4 wherein the first switching pattern is operable during negative half cycles of the AC input waveform and the second switching pattern is operable during positive half cycles of the AC input waveform.

7. The stacked half-bridge AC-AC converter of claim 3 wherein the one or more switching patterns include one or more of:
a third switching pattern operable during alternating half cycles of an AC input waveform, the third switching pattern consisting of the seventh switching state, followed by the sixth switching state, followed by the eighth switching state, followed by the fifth switching state; and
a fourth switching pattern operable during alternating half cycles of the AC input waveform, the fourth switching pattern consisting of the seventh switching state, followed by the fifth switching state, followed by the eighth switching state, followed by the sixth switching state.

8. The stacked half-bridge AC-AC converter of claim 7 wherein the third switching pattern is operable during positive half cycles of the AC input waveform and the fourth switching pattern is operable during negative half cycles of the AC input waveform.

9. The stacked half bridge AC-AC converter of claim 7 wherein the fourth switching pattern is operable during negative half cycles of the AC input waveform and the third switching pattern is operable during positive half cycles of the AC input waveform.

10. The stacked half-bridge AC-AC converter of claim 3 wherein the one or more switching patterns include one or more of:
a fifth switching pattern operable during alternating half cycles of an AC input waveform, the fifth switching pattern consisting of the fifth switching state, followed by the eighth switching state, followed by the sixth switching state; and
a sixth switching pattern operable during alternating half cycles of the AC input waveform, the sixth switching pattern consisting of the seventh switching state, followed by the sixth switching state, followed by the fifth switching state.

11. The stacked half-bridge AC-AC converter of claim 10 wherein the fifth switching pattern is operable during positive half cycles of the AC input waveform and the sixth switching pattern is operable during negative half cycles of the AC input waveform.

12. The stacked half bridge AC-AC converter of claim 10 wherein the sixth switching pattern is operable during negative half cycles of the AC input waveform and the fifth switching pattern is operable during positive half cycles of the AC input waveform.

13. A stacked half-bridge AC-AC converter comprising:
a first half bridge including a first switching device and a second switching device, wherein a junction point of the first and second switching devices is coupled to a first AC output terminal of the converter;
a second half bridge including a third switching device and a fourth switching device, wherein a junction point of the third and fourth switching devices is coupled to a second AC output terminal of the converter and wherein the first and second half bridges are connected in a ladder configuration across an AC input of the converter;
first and second input capacitors connected in a ladder configuration across the AC input of the converter, wherein a junction point of the first and second capacitors is connected to a junction point of the first and second half bridges forming a neutral point of the converter; and
a third input capacitor connected across the AC input of the converter having a capacitance value selected to alter a high frequency current path of the converter so as to equalize current between an outer switch pair including the first and fourth switching devices and an inner switch pair including the second and third switching devices.

14. A stacked half bridge converter configured to provide an AC output voltage, the stacked half bridge converter comprising:
four switching devices configured in an upper half bridge and a lower half bridge and at least two capacitors, wherein:

an input of the power converter is provided across a first terminal of a first switching device and a second terminal of a fourth switching device and an output of the converter is provided between a junction of a second terminal of the first switching device and a first terminal of a second switching device and a junction of a second terminal of a third switching device and a first terminal of the fourth switching device;

the at least two capacitors include a first capacitor coupled between the first terminal of the first switching device and a neutral point corresponding to a junction of a second terminal of the second switching device and a first terminal of the third switching device and a second capacitor coupled between the second terminal of the fourth switching device and the neutral point; and a control circuit configured to operate the switching devices according to a plurality of pulse width modulated switching sequences, each switching sequence including one or more switching patterns, each switching pattern including one or more switching states of the switching devices;

wherein the input of the power converter is configured to receive an AC voltage, and the control circuit is configured control the voltage appearing across the first and second capacitors to reduce switching losses.

15. A stacked half-bridge AC-AC converter comprising:

a first half bridge including a first switching device and a second switching device, wherein a junction point of the first and second switching devices is coupled to a first AC output terminal of the converter;

a second half bridge including a third switching device and a fourth switching device, wherein a junction point of the third and fourth switching devices is coupled to a second AC output terminal of the converter and wherein the first and second half bridges are connected in a ladder configuration across an AC input of the converter;

first and second input capacitors connected in a ladder configuration across the AC input of the converter, wherein a junction point of the first and second capacitors is connected to a junction point of the first and second half bridges forming a neutral point of the converter; and a controller configured to operate the switching devices according to a plurality of switching sequences, each switching sequence including one or more switching patterns, and each switching pattern including a plurality of switching states, each switching state including modulated operation of at least one switching device from each of the first and second half bridges, wherein:

at least one of the plurality of switching sequences includes one or more patterns of switching states selected to inject current into the neutral point to regulate a voltage of the neutral point;

at least one of the plurality of switching sequences injects positive current into the neutral point to increase the voltage of the neutral point; and at least one switching sequence is selected to inject negative current into the neutral point to decrease the voltage of the neutral point.

16. The stacked half-bridge AC-AC converter of claim 15 wherein the one or more switching patterns include one or more of:

a first switching pattern operable during alternating half cycles of an AC input waveform, the first switching pattern consisting of repeated alternation of a switching state in which the first and fourth switching devices are operated followed by a switching state in which the second and third switching devices are operated; and a second switching pattern operable during alternating half cycles of the AC input waveform, the second switching pattern consisting of repeated alternation of the switching state in which the second and third switching devices are operated followed by the switching state in which the first and fourth switching devices are operated.

17. The stacked half-bridge AC-AC converter of claim 15 wherein the one or more switching patterns include one or more of:

a third switching pattern operable during alternating half cycles of an AC input waveform, the third switching pattern consisting of a switching state in which the first and third switching devices are operated, followed by a switching state in which the second and third switching devices are operated, followed by a switching state in which second and fourth switching devices are operated, followed a switching state in which the first and fourth switching devices are operated; and a fourth switching pattern operable during alternating half cycles of the AC input waveform, the fourth switching pattern consisting of the switching state in which the first and third switching devices are operated, followed by the switching state in which the first and fourth switching devices are operated, followed by the switching state in which second and fourth switching devices are operated, followed by the switching state in which the second and third switching devices are operated.

18. The stacked half-bridge AC-AC converter of claim 15 wherein the one or more switching patterns include one or more of:

a fifth switching pattern operable during alternating half cycles of an AC input waveform, the fifth switching pattern consisting of a switching state in which the first and fourth switching devices are operated, followed by a switching state in which second and fourth switching devices are operated, followed by a switching state in which the second and third switching devices are operated; and a sixth switching pattern operable during alternating half cycles of the AC input waveform, the sixth switching pattern consisting of the switching state in which the first and third switching devices are operated, followed by the switching state in which the second and third switching devices are operated, followed by the switching state in which the first and fourth switching devices are operated.

19. A stacked half bridge converter configured to provide an AC output voltage, the stacked half bridge converter comprising:

four switching devices configured in an upper half bridge and a lower half bridge and at least two capacitors, wherein:

an input of the power converter is provided across a first terminal of a first switching device and a second terminal of a fourth switching device and an output of the converter is provided between a junction of a second terminal of the first switching device and a first terminal of a second switching device and a junction of a second terminal of a third switching device and a first terminal of the fourth switching device;

the at least two capacitors include a first capacitor coupled between the first terminal of the first switching device and a neutral point corresponding to a junction of a second terminal of the second switching device and a first terminal of the third switching device and a second capacitor coupled between the second terminal of the fourth switching device and the neutral point; and a control circuit configured to operate the switching devices according to a plurality of switching sequences, each switching sequence including one or more switching patterns, each switching pattern including one or more switching states of the switching devices, wherein:

at least one of the plurality of switching sequences injects positive current into the neutral point to increase the voltage of the neutral point; and at least one switching sequence is selected to inject negative current into the neutral point to decrease the voltage of the neutral point;

wherein the input of the power converter is configured to receive an AC voltage, and the control circuit is configured control the voltage appearing across the first and second capacitors to reduce switching losses.

\* \* \* \* \*